US006025288A

United States Patent [19]
Zoitos et al.

[11] Patent Number: 6,025,288
[45] Date of Patent: *Feb. 15, 2000

[54] HIGH TEMPERATURE RESISTANT GLASS FIBER

[75] Inventors: Bruce Zoitos, Buffalo, N.Y.; Richard E. A. Atkinson, South Bend, Ind.; James R. Olson, Youngstown, N.Y.

[73] Assignee: Unifrax Corporation, Niagara Falls, N.Y.

[*] Notice: This patent is subject to a terminal disclaimer.

[21] Appl. No.: 09/231,382

[22] Filed: Jan. 13, 1999

Related U.S. Application Data

[63] Continuation of application No. 09/133,750, Aug. 13, 1998, which is a continuation of application No. 08/740,826, Oct. 29, 1996, Pat. No. 5,874,375.
[60] Provisional application No. 60/008,064, Oct. 30, 1995.

[51] Int. Cl.⁷ .................................................. C03C 13/06
[52] U.S. Cl. .............................................. 501/36; 501/38
[58] Field of Search ........................................ 501/36, 38

[56] References Cited

U.S. PATENT DOCUMENTS

| | | | |
|---|---|---|---|
| 3,687,850 | 8/1972 | Gagin | 501/35 |
| 4,604,097 | 8/1986 | Graves, Jr. et al. | 623/11 |
| 4,933,307 | 6/1990 | Marshall et al. | 501/39 |
| 5,005,428 | 10/1991 | Porter | 501/35 |
| 5,108,957 | 4/1992 | Cohen et al. | 501/35 |
| 5,250,488 | 10/1993 | Theolan et al. | 501/36 |
| 5,284,807 | 2/1994 | Komori et al. | 501/35 |
| 5,332,699 | 7/1994 | Olds et al. | 501/36 |
| 5,569,629 | 10/1996 | Teneyck et al. | 501/35 |
| 5,583,080 | 12/1996 | Guldberg et al. | 501/36 |
| 5,585,312 | 12/1996 | Teneyck et al. | 501/35 |
| 5,811,360 | 9/1998 | Jubb | 501/36 |

FOREIGN PATENT DOCUMENTS

| | | |
|---|---|---|
| 2017344 | 5/1989 | Canada . |
| 2043699 | 6/1990 | Canada . |
| 1271785 | 7/1990 | Canada . |
| 2662687 | 6/1990 | France . |
| 49-85337 | 7/1974 | Japan . |
| WO 87/05007 | 8/1987 | WIPO . |
| WO 90/02713 | 9/1988 | WIPO . |
| WO 89/12032 | 12/1989 | WIPO . |
| WO 92/07801 | 11/1990 | WIPO . |
| WO 92/09536 | 6/1992 | WIPO . |
| WO 93/15028 | 8/1993 | WIPO . |
| WO 94/15883 | 7/1994 | WIPO . |

OTHER PUBLICATIONS

Maier et al. *Nucleation and Crystallization in Mg–Al silicate–glass–ceramics*, cfi/ber.DKG 6/7, 1988, pp. 208–212.

*Primary Examiner*—Karl Group
*Attorney, Agent, or Firm*—Renner, Kenner, Greive, Bobak Taylor & Weber

[57] ABSTRACT

A refractory glass fiber having a use temperature of greater than 1000° C., up to at least 1260° C., having an after service mechanical integrity comparable to conventional refractory ceramic fiber and which is non-durable in physiological fluids, consisting essentially of the product of silica, magnesia and optionally zirconia, is produced from a melt, optionally containing a viscosity modifier.

32 Claims, 11 Drawing Sheets

HIGH TEMPERATURE RESISTANT GLASS FIBER

CROSS-REFERENCE TO RELATED APPLICATIONS

This application is a continuation of copending U.S. Ser. No. 09/133,750, filed Aug. 13, 1998, which is a continuation-in-part application of U.S. Ser. No. 08/740,826, filed Oct. 29, 1996, now U.S. Pat. No. 5,874,375, which claims priority from U.S. Provisional Application No. 60/008,064, filed Oct. 30, 1995.

TECHNICAL FIELD

The present invention is directed to high temperature resistant glass fiber, useful as a heat or sound insulating material, which has a use temperature limit at least up to 1260° C. More particularly, the present invention is directed to high temperature resistant fiber that is easily manufacturable, and which exhibits low shrinkage and retains good mechanical strength after exposure to the service temperature, yet which is non-durable in physiological fluids.

BACKGROUND OF THE INVENTION

The insulation material industry has determined that it is desirable to utilize fibers in heat and sound insulating applications which are not durable in physiological fluids, such as lung fluid. While candidate materials have been proposed, the use temperature limit of these materials have not been high enough to accommodate many of the applications to which high temperature resistant fibers, including refractory glass and ceramic fibers, are applied. In particular, high temperature resistant fibers should exhibit minimal linear shrinkage at expected exposure temperatures, in order to provide effective thermal protection to the article being insulated.

Many compositions within the man-made vitreous fiber family of materials have been proposed which are decomposable in a physiological medium. These glass fibers generally have a significant alkali metal oxide content, which often results in a low use temperature limit.

Canadian Patent Application 2017344 describes a glass fiber having physiological solubility formed from glasses containing as required components silica, calcia and $Na_2O$, as preferred components, magnesia and $K_2O$, and as optional components boria, alumina, titania, iron oxides, and fluoride.

International Publication WO 90/02713 describes mineral fibers which are soluble in saline solutions, the fibers having a composition including silica, alumina, iron oxide, calcia, magnesia, $Na_2O$ and $K_2O$.

U.S. Pat. No. 5,108,957 describes glass compositions useful for forming fibers which are able to be degraded in a physiological medium containing as required components silica, calcia, $Na_2O$ plus $K_2O$, and boria, and optionally alumina, magnesia, fluoride and $P_2O_5$. It describes the presence of phosphorus as having the effect of increasing the rate of decomposition of the fibers in a physiological medium.

Other patents which cite the effect of phosphorus in favoring biological solubility of mineral fibers include International Publication WO 92/09536, describing mineral fibers containing substantially silica and calcia, but optionally magnesia and $Na_2O$ plus $K_2O$, in which the presence of phosphorus oxide decreases the stabilizing effect of aluminum and iron on the glass matrix. These fibers are typically produced at lower temperatures than refractory ceramic fibers. We have observed that at melt temperatures required for high temperature resistant fibers (1700–2000° C.), phosphorus oxide at levels as low as a few percent can cause severe degradation and/or erosion of furnace components.

Canadian Patent Application 2043699 describes fibers which decompose in the presence of a physiological medium, which contain silica, alumina, calcia, magnesia, $P_2O_5$, optionally iron oxide, and $Na_2O$ plus $K_2O$. French Patent Application 2662687 describe mineral fibers which decompose in the presence of a physiological medium, which contain silica, alumina, calcia, magnesia, $P_2O_5$, iron oxide and $Na_2O$ plus $K_2O$ plus $TiO_2$.

U.S. Pat. No. 4,604,097 describes a bioabsorbable glass fiber comprising generally a binary mixture of calcia and phosphorous pentoxide, but having other constituents such as calcium fluoride, water, and one or more oxides such as magnesia, zinc oxide, strontium oxide, sodium oxide, potassium oxide, lithium oxide or aluminum oxide.

International Publication WO 92/07801 describes a bioabsorbable glass fiber comprising phosphorous pentoxide, and iron oxide. A portion of the $P_2O_5$ may be replaced by silica, and a portion of the iron oxide may be replaced by alumina. Optionally the fiber contains a divalent cation compound selected from Ca, Zn and/or Mg, and an alkali metal cation compound selected from Na, K, and/or Li.

U.S. Pat. No. 5,055,428 describes a soda lime aluminoboro-silicate glass fiber composition which is soluble in a synthetic lung solution. Alumina content is decreased with an increase in boria, and an adjustment in silica, calcia, magnesia, $K_2O$ and optionally $Na_2O$. Other components may include iron oxide, titania, fluorine, barium oxide and zinc oxide.

International Publication WO 87/05007 describes inorganic fiber having solubility in saline solution and including silica, calcia, magnesia, and optionally alumina. International Publication WO 89/12032 describes inorganic fiber having extractable silicon in physiological saline solution and including silica, calcia, optionally magnesia, alkali metal oxides, and one or more of alumina, zirconia, titania, boria and iron oxides.

International Publication WO 93/15028 describes vitreous fibers that are saline soluble which in one usage crystallize to diopside upon exposure to 1000° C. and/or 800° C. for 24 hours and have the composition described in weight percent of silica 59–64, alumina 0–3.5, calcia 19–23 and magnesia 14–17, and which in another usage crystallize to wollastonite/pseudowollastonite and have the composition described in weight percent of silica 60–67, alumina 0–3.5, calcia 26–35 and magnesia 4–6.

The fibers described in the above identified patent publications are limited, however, in their use temperature, and are therefore unsuitable for high temperature insulation applications, such as furnace linings for use above 1000° C., and reinforcement applications such as metal matrix composites and friction applications.

A product based on non-durable fiber chemistry is marketed by Unifrax Corporation (Niagara Falls, N.Y.) under the trademark INSULFRAX, having the nominal weight percent composition of 65% $SiO_2$, 31.1% CaO, 3.2% MgO, 0.3% $Al_2O_3$ and 0.3% $Fe_2O_3$. Another product is sold by Thermal Ceramics (located in Augusta, Ga.) under the trademark SUPERWOOL, and is composed of 58.5% $SiO_2$, 35.4% CaO, 4.1% MgO and 0.7% $Al_2O_3$ by weight. This material has a use limit of 1000° C. and melts at approximately 1280° C., which is too low to be desirable for the high temperature insulation purposes described above.

International Application WO 94/15883 discloses CaO/MgO/SiO$_2$ fibers with additional constituents Al$_2$O$_3$, ZrO$_2$, and TiO$_2$, for which saline solubility and refractoriness were investigated. That document states that saline solubility appeared to increase with increasing amounts of MgO, whereas ZrO$_2$ and Al$_2$O$_3$ were detrimental to solubility. The presence of TiO$_2$ (0.71–0.74 mol%) and Al$_2$O$_3$ (0.51–0.55 mol%) led to the fibers failing the shrinkage criterion of 3.5% or less at 1260° C. The document further states that fibers that are too high in SiO$_2$ are difficult or impossible to form, and cites samples having 70.04, 73.28 and 78.07% SiO$_2$ as examples which could not be fiberized.

In addition to temperature resistance as expressed by shrinkage characteristics that are important in fibers that are used in insulation, it is also required that the fibers have mechanical strength characteristics during and following exposure to the use or service temperature, that will permit the fiber to maintain its structural integrity and insulating characteristics in use.

One characteristic of the mechanical integrity of a fiber is its after service friability. The more friable a fiber, that is, the more easily it is crushed or crumbled to a powder, the less mechanical integrity it possesses. We have observed that, in general, refractory fibers that exhibit both high temperature resistance and non-durability in physiological fluids also exhibit a high degree of after service friability. This results in the fiber's lacking the strength or mechanical integrity after exposure to the service temperature to be able to provide the necessary structure to accomplish its insulating purpose.

We have found that high temperature resistant, non-durable fibers which do exhibit good mechanical integrity have very small-scale or fine crystalline microstructures after exposure to service temperature. Other measures of mechanical integrity of fibers include compression strength and compression recovery.

Refractory glass compositions which may exhibit target durability, shrinkage at temperature, and strength characteristics may not, however, be susceptible to fiberization, either by spinning or blowing from a melt of its components.

It is therefore an object of the present invention to provide high temperature resistant refractory glass fiber, that is readily manufacturable from a melt having a viscosity suitable for blowing or spinning fiber, and which is non-durable in physiological fluids.

It is a further object of the present invention to provide high temperature resistant refractory glass fiber, which is non-durable in physiological fluids, and which exhibits good mechanical strength after exposure to service temperature.

It is a further object of the present invention to provide high temperature resistant refractory glass fiber, which is non-durable in physiological fluids, yet which exhibits low after service friability.

It is a further object of the present invention to provide high temperature resistant refractory glass fiber, which is non-durable in physiological fluids, and which preferably exhibits a small-scale or fine microstructure after initial exposure to service temperature.

It is a further object of the present invention to provide high temperature resistant refractory glass fiber, which is non-durable in physiological fluids, and which exhibits high compression strength and recovery from compression after exposure to service temperature.

It is a further object of the present invention to provide a high temperature resistant refractory glass fiber, which is non-durable in physiological fluids, and which exhibits low shrinkage at the use temperature.

SUMMARY OF THE INVENTION

High temperature resistant refractory glass fibers are provided which are non-durable in physiological fluids. The fibers are 4 to 150 times more soluble in simulated lung fluid than standard aluminosilicate refractory ceramic fibers, and exhibit a temperature use limit of from at least 1000° up to 1260° C., or greater. At these high temperatures, fibers of the present invention as described below undergo less than about a 6% linear shrinkage, preferably less than about a 4.5% linear shrinkage, and most preferably less than about 3% linear shrinkage when held at temperature for 24 or 168 hours. The fibers of the present invention retain mechanical strength after exposure to service temperatures. In contrast to the teachings of the art, fibers of the present invention meeting the requirements of being fiberizable, refractory, and non-durable, have been identified in which the compositions contain SiO$_2$ in the range of 70 to 86 weight percent.

According to the present invention, there is provided a low shrinkage, refractory glass fiber based on a magnesium silicate system having a use temperature up to at least 1260° C., which maintains mechanical integrity after exposure to the use temperature and which is non-durable in physiological fluids, such as lung fluid.

The non-durable refractory glass fiber according to one embodiment of the present invention consists essentially of the product of about 69 to about 80 weight percent silica, about 20 to about 31 weight percent magnesia, 0 to about 7 weight percent zirconia, 0 to about 2 weight percent alumina, and 0 to about 1 weight percent boria. The fiber should contain not more than about 1 weight percent calcia impurity and not more than about 0.4 weight percent iron oxides impurity, (calculated as Fe$_2$O$_3$).

The fibers of the present invention preferably contain substantially no alkali metal, greater than trace impurities. The presence of iron oxides and calcia should be limited to the extent possible.

The present invention also provides a high temperature resistant glass fiber consisting essentially of the product of about 71 to about 78 weight percent silica, about 20 to about 27.5 weight percent magnesia, 0 to about 5 weight percent zirconia, 0 to about 2.5 weight percent alumina and 0 to 1 weight percent boria.

The present invention further provides a high temperature resistant glass fiber consisting essentially of the product of about 71 to about 76.5 weight percent silica, about 21.5 to about 27.5 weight percent magnesia, 0 to about 5 weight percent zirconia, 0 to about 2.5 weight percent alumina and 0 to about 1 weight percent boria.

The present invention further provides a high temperature resistant glass fiber consisting essentially of the product of about 71 to about 76.5 weight percent silica, about 21.5 to about 27.5 weight percent magnesia and 0 to about 2 weight percent alumina.

The present invention further provides a high temperature resistant glass fiber consisting essentially of the product of about 75 to about 76.5 weight percent silica, about 21 to about 23.5 weight percent magnesia and 0 to about 1.7 weight percent alumina.

The present invention further provides a high temperature resistant glass fiber consisting essentially of the product of about 71 to about 75 weight percent silica, about 22.5 to about 25 weight percent magnesia, 0 to about 5 weight percent zirconia and 0 to about 2.5 weight percent alumina, and wherein the combined weight percent of alumina and zirconia is about 0.25 to about 4.25.

The present invention provides a process for the production of refractory glass fiber having a use temperature up to at least 1260° C., which maintains mechanical integrity after exposure to the service temperature and which is non-durable in physiological fluids comprising:

forming a melt with the ingredients consisting essentially of about 69 to about 80 weight percent silica, about 20 to about 31 weight percent magnesia, 0 to about 7 weight percent zirconia, 0 to about 2 weight percent alumina, and 0 to about 1 weight percent boria, and producing fibers from the melt.

The present invention further provides a process for the production of high temperature resistant glass fiber having a use temperature up to at least 1260° C., which maintains mechanical integrity after exposure to the service temperature and which is non-durable in physiological fluids comprising:

forming a melt with ingredients consisting essentially of about 71 to about 78 weight percent silica, about 20 to about 27.5 weight percent magnesia, 0 to about 2.5 weight percent alumina, and 0 to about 1 weight percent boria, and optionally 0 to about 5 weight percent zirconia; and producing fibers from the melt.

The melt compositions utilized to produce the fibers of the present invention provide a melt viscosity suitable for blowing or spinning fiber, and for controlling crystal structure of the resultant fibers so as to impart mechanical strength after exposure to service temperature.

DETAILED DESCRIPTION OF THE INVENTION

Figure 1A:
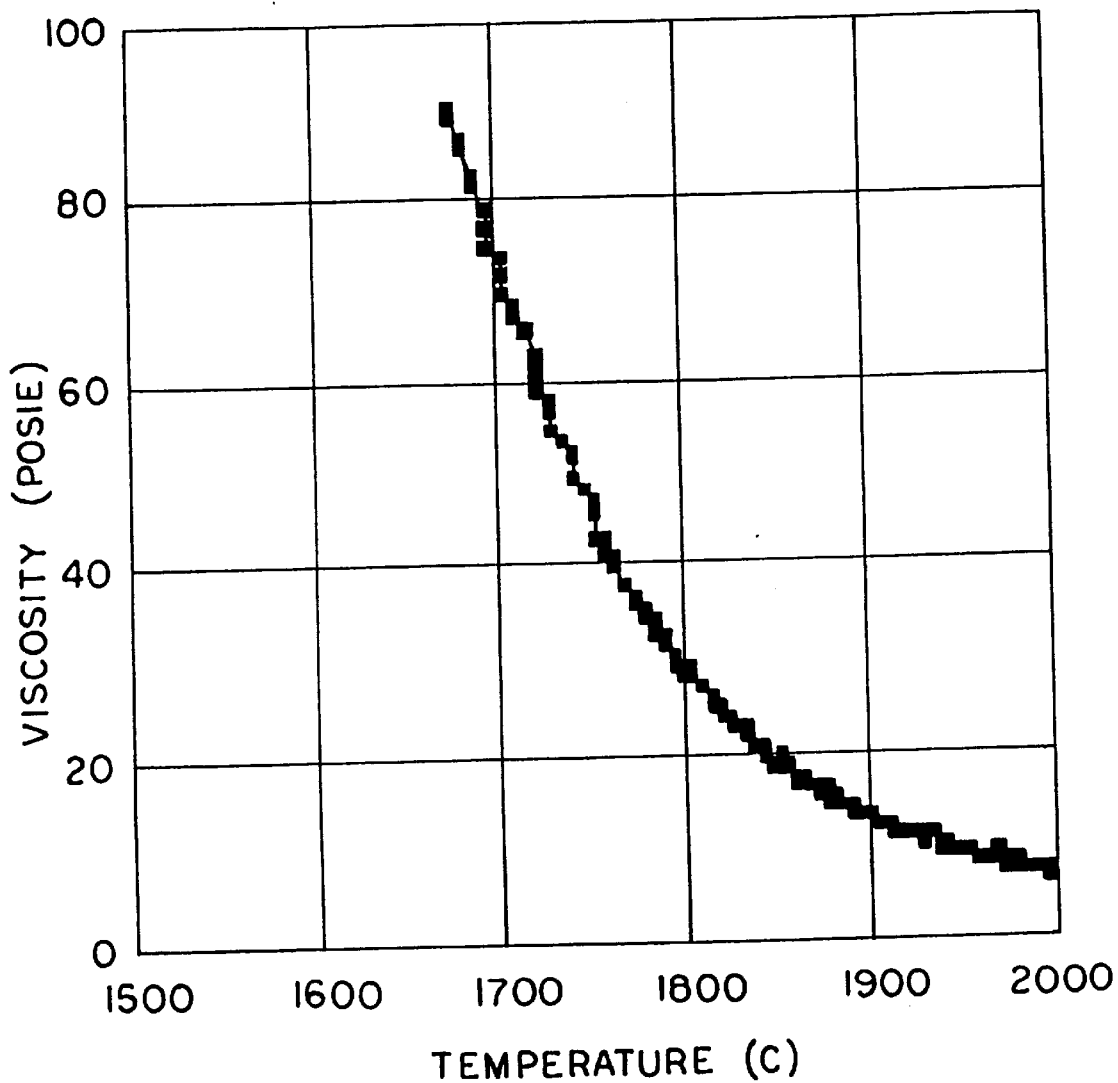
FIG. 1A is a viscosity vs. temperature curve of a melt chemistry for a commercially available, spun aluminosilicate fiber.

According to the present invention, there is provided refractory glass fiber useful as a heat or sound insulation material, which has a temperature use limit greater than 1260° C. and which is non-durable in physiological fluids, such as lung fluid. By non-durable in physiological fluids is meant that the fiber at least partially dissolves in such fluids (such as simulated lung fluid) during in vitro tests.

In order for a glass composition to be a viable candidate for producing a satisfactory high temperature refractory fiber product, the fiber to be produced must be manufacturable, sufficiently soluble in physiological fluids, and capable of surviving high temperatures with minimal shrinkage and minimal loss of integrity. To identify materials which meet these criteria, a set of screening tests were used to identify fibers that exhibit the target properties. These tests include (a) viscosity/fiberization, (b) durability, (c) shrinkage at temperature and (d) after-service friability, strength and resilience.

"Viscosity" refers to the ability of a glass melt to resist flow or shear stress. The viscosity-temperature relationship is critical in determining whether it is possible to fiberize a given glass composition. An optimum viscosity curve would have a low viscosity (5–50 poise) at the fiberization temperature and would gradually increase as the temperature decreased. If the melt is not sufficiently viscous (ie. too thin) at the fiberization temperature, the result is a short, thin fiber, with a high proportion of unfiberized material (shot). If the melt is too viscous at the fiberization temperature, the resulting fiber will be extremely coarse (high diameter) and short.

Viscosity is dependent upon melt chemistry, which is also affected by elements or compounds that act as viscosity modifiers. We have found for this fiber chemistry system, that alumina and boria act as viscosity modifiers which permit fibers to be blown or spun. It is necessary, however, according to the present invention, that such viscosity modifiers, either by type or amount, do not adversely impact the solubility, shrink resistance, or mechanical strength of the blown or spun fiber.

Viscosity-temperature profiles may be measured on a viscometer, capable of operating at elevated temperatures. In addition, an adequate viscosity profile may be inferred by routine experimentation, examining the quality of fiber (index, diameter, length) produced.

The durability test measures the rate at which mass is lost from the fiber ($ng/cm^2$-hr) under conditions which simulate the temperature and chemical conditions found in the human lung. This test consists of exposing approximately 0.1 g of de-shotted fiber to a 0.3 ml/min flow of simulated lung fluid (SLF). The entire test system is maintained at 37° C., to simulate the temperature of the human body. Tests preferably last for between about two and four weeks.

After the SLF has flowed through the fiber, it is collected and analyzed for glass constituents using Inductively Coupled Plasma Spectroscopy. A "blank" SLF sample is also measured and used to correct for elements present in the SLF. Once this data has been obtained, it is possible to calculate the rate at which the fiber has lost mass over the time interval of the study.

Fibers are tested for shrinkage by wet-forming them into a pad, measuring by means of calipers the pad's length and width dimensions (typically 3×5 inches), placing the pad into a furnace, ramping to temperature and holding for a fixed period of time. After heating, the pads are re-measured to determine any changes in dimension which have occurred.

In one such test, pads were made by mixing about 427 grams fiber, 27.2 grams of phenolic binder and about 4 gallons of water, pouring the mixture into a sheet mold and allowing the water to drain through the bottom of the mold. The pad was dried and a piece measuring 3 inches by 5 inches by 1 inch was cut. The length and width of this piece were carefully measured, and the pad was placed in a furnace and brought to a temperature of 1260° C. for 24, 168 or 672 hours. After cooling, the lateral dimensions were measured and the linear shrinkage was determined by comparing "before" and "after" measurements. If the fiber is available in blanket form, measurements may be made directly on the blanket without the need to form a pad. (Such blanket shrinkage measurements correlate to, but are not identical to, pad shrinkage measurements.)

After-service friability refers to the ability of fiber to retain its mechanical integrity after exposure to high temperatures. This is an important property, since fiber must support its own weight in any application and must also be able to resist abrasion due to moving air or gas. Indications of fiber integrity and mechanical strength are provided by visual and tactile observations, as well as mechanical measurement of these properties of after-service temperature exposed fibers.

Shrinkage pad after service integrity is indicated by two tests: compression strength and compression recovery. These tests measure, respectively, how easily the pad may be deformed and the amount of resiliency (or compression recovery) the pad exhibits after a compression of 50%.

Shrinkage pads prepared from fibers of the present invention were heated at 1260° C. for 24 or 168 hours, and were then compression tested using an Instron testing device. A 2.5 inch diameter cylindrical ram was pushed into the shrinkage pad until the pad was compressed to half its original thickness. At this point, the crosshead was stopped and the peak load (in psi) encountered during compression was recorded.

Compression recovery was then measured by slowly reversing the travel direction of the crosshead and backing the cylindrical ram out of the shrinkage pad until the load reading was zero. The distance of travel from the 50% compression point to the zero load point was recorded and expressed as a percentage of original pad thickness. This number is indicative of the amount of resiliency of the fiber pad.

By this testing criteria, a poorly performing pad would have low values for compressive strength indicating that it is easily compressed, and low values for compression recovery indicating that once deformed the pad experiences little recovery. Conversely, a pad/fiber composition with high values for these parameters exhibits high mechanical strength and is considered a good-performer. An ideal fiber would have a compressive strength within a target range comparable to a standard, commercial aluminosilicate fiber, and additionally having high compression recovery, or resiliency.

Upon heating to service temperature, the glass fibers, which are generally amorphous as manufactured, undergo crystallization. In part, the size of the resulting crystals affects the mechanical properties of the fiber. It has been observed that strong, resilient fibers demonstrate very small grain size after firing. Fibers which are fragile after firing typically have very large grains.

One measurement of after service grain size is conducted as follows. Fiber samples are fired at 1260° C. (typically for 24 hours). The fired sample is then mounted in epoxy and the epoxy is allowed to harden. The epoxy mount is then polished to provide a smooth cross-section of the fiber. This polished mount is then examined using a scanning electron microscope operating in either the backscattered or secondary electron imaging mode (whichever gives the best contrast between the crystal phases) and a photomicrograph is taken.

A line is drawn across the micrograph (usually from corner to corner) and the number of crystal intersections with this line is counted. The length of the line is measured and converted to microns, based on the scale of the photomicrograph. For example, a 5 cm line drawn on a 1000× micrograph would be measured as 5/1000 cm or 50 microns. The length of the line is divided by the number of crystal intersections to give an approximate size per crystal.

In some cases, crystal size is too small or boundaries too diffuse to allow measurement by this method. In such cases, the size of a "typical" crystal may be estimated by comparison to the micron bar on the micrograph.

We have found that the addition of zirconia to magnesium silicate fibers, in levels up to about 11 weight percent, improves the after-service microstructure and lowers the friability of the resulting non-durable, refractory glass fibers. We have found that this addition of zirconia in the fibers also results in the formation of very small scale microstructures when the fiber is exposed to temperatures of up to 1260° C. for up to 24 hours. This small scale or fine microstructure provides good mechanical fiber integrity after exposure to the service temperature. This microstructure may coarsen slightly with prolonged exposure to use temperature; however, these fibers retain their improved mechanical properties after such extended exposure relative to other non-durable, temperature resistant fibers.

A mechanism by which small grain size may improve fiber strength is in creating a fiber with smaller irregularities, as a small grained fiber will have a smoother surface than a coarse-grained fiber. Surface flaws may act as stress raisers and provide points at which the fiber may be easily broken.

Although zirconia is known to decrease glass dissolution rates in SLF, in the fibers of the present invention, this effect is shown to be sufficiently small so that the resulting fiber exhibits target solubility in SLF.

The combination of nondurability, that is, solubility in SLF, and maintenance of mechanical integrity after exposure to service temperatures of 1260° C., has not been demonstrated by fibers disclosed or used by others in the industry. The present invention controls fiber microstructure upon devitrification, that is, heating to service temperature, through the addition of up to 11 weight percent $ZrO_2$, which modifies crystallization, to the production melt.

Analysis of the durability of the above fibers in simulated lung fluid indicates that these fibers are significantly less durable than normal refractory ceramic fiber, such as aluminosilicates (about 50/50 weight percent) and alumino-zirconia-silicates or AZS (about 30/16/54 weight percent).

The non-durable refractory glass fibers according to the present invention are made by standard glass and ceramic fiber manufacturing methods. Raw materials, such as silica, any suitable source of magnesia such as enstatite, forsterite, magnesia, magnesite, calcined magnesite, magnesium zirconate, periclase, steatite, or talc, and any suitable source of zirconia such as baddeleyite, magnesium zirconate, zircon or zirconia, are delivered in selected proportions from bins to a furnace where they are melted and blown using a fiberization nozzle, or spun, either in a batch or a continuous mode.

The viscosity of the melt may optionally be controlled by the presence of viscosity modifiers, sufficient to provide the fiberization required for the desired applications. The viscosity modifiers may be present in the raw materials which supply the main components of the melt, or may, at least in part, be separately added. Desired particle size of the raw materials is determined by furnacing conditions, including furnace size (SEF), pour rate, melt temperature, residence time, and the like.

According to one embodiment of the present invention, the refractory glass fiber is capable of withstanding a use temperature of at least up to 1260° C. with less than about 6% linear shrinkage, preferably less than about 4.5% linear shrinkage, exhibits low after service friability, and is non-durable in physiological fluids, such as lung fluid. Most preferably, the linear shrinkage of the fiber is less than about 3%. The non-durable refractory glass fiber of the present invention consists essentially of the product of about 69 to about 80 weight percent silica, about 20 to about 31 weight percent magnesia, 0 to about 7 weight percent zirconia, and optionally, an effective amount of a viscosity modifier. The fiber should contain not more than about 1 weight percent calcia impurity and not more than about 0.4 weight percent iron oxides impurity (calculated as $Fe_2O_3$). The viscosity modifier may be selected from alumina, boria and mixtures thereof. Other elements or compounds may be utilized as viscosity modifiers which, when added to the melt, affect the melt viscosity so as to approximate the profile, or shape, of the viscosity/temperature curve of a melt that is readily fiberizable, as discussed below.

EXAMPLES 1–2

The following compositions were tested to further assess the effect of zirconia on magnesium silicate composition performance. Samples having the nominal weight percent compositions set forth below were heat treated at 1260° C. for up to 24 hours.

TABLE I

|  | $SiO_2$: | MgO: | $ZrO_2$ |
|---|---|---|---|
| Ex. 1 | 75 | 14 | 11 |
| Ex. 2 | 75 | 19.5 | 5.5 |

These samples were examined and found to have good microstructures as required to provide good after-service mechanical strength.

Comparative Example A

Fiber having the nominal composition 71.5 wt% $SiO_2$, 24.5 wt% CaO, 3.2 wt% $Al_2O_3$ and 0.1 wt% $TiO_2$ was tested and was found to meet durability and shrinkage targets. This fiber failed, however, when heated rapidly. We have theorized that the failure of this sample was due to poor crystal nucleation in the fiber, and/or excessive alumina impurity.

Comparative Example B

Fiber having the composition 75.3 wt% $SiO_2$ and 21.0 wt% CaO, with 1.5 wt% $TiO_2$ added as a nucleating agent, was made which met durability and shrinkage targets, and was tolerant of rapid heating. However, this material had excessive after service friability, exhibiting poor resiliency and crumbling to the touch.

The samples were heat treated at 1260° C. for 24 hours. Microstructural analysis by scanning electron microscopy revealed that titania-containing structures had a coarser microstructure.

Titania had a strong negative impact on the after-service integrity of calcium silicate fibers. At a level of 1.5 weight percent, titania caused substantial grain growth and very high after service friability (that is, low mechanical strength.) In contrast, the after-service integrity of zirconia containing fibers was improved relative to titania containing fibers after short term heating (less than about one month).

Viscosity vs Temperature

The shape of the viscosity vs. temperature curve for a glass composition is representative of the ease with which a melt will fiberize and thus, of the quality of the resulting fiber (affecting, for example, the fiber's shot content, fiber diameter, and fiber length). Glasses generally have low viscosity at high temperatures. As temperature decreases, the viscosity increases. The value of the viscosity at a given temperature will vary as a function of composition, as will the overall steepness of the viscosity vs. temperature curve.

Figure 1B:
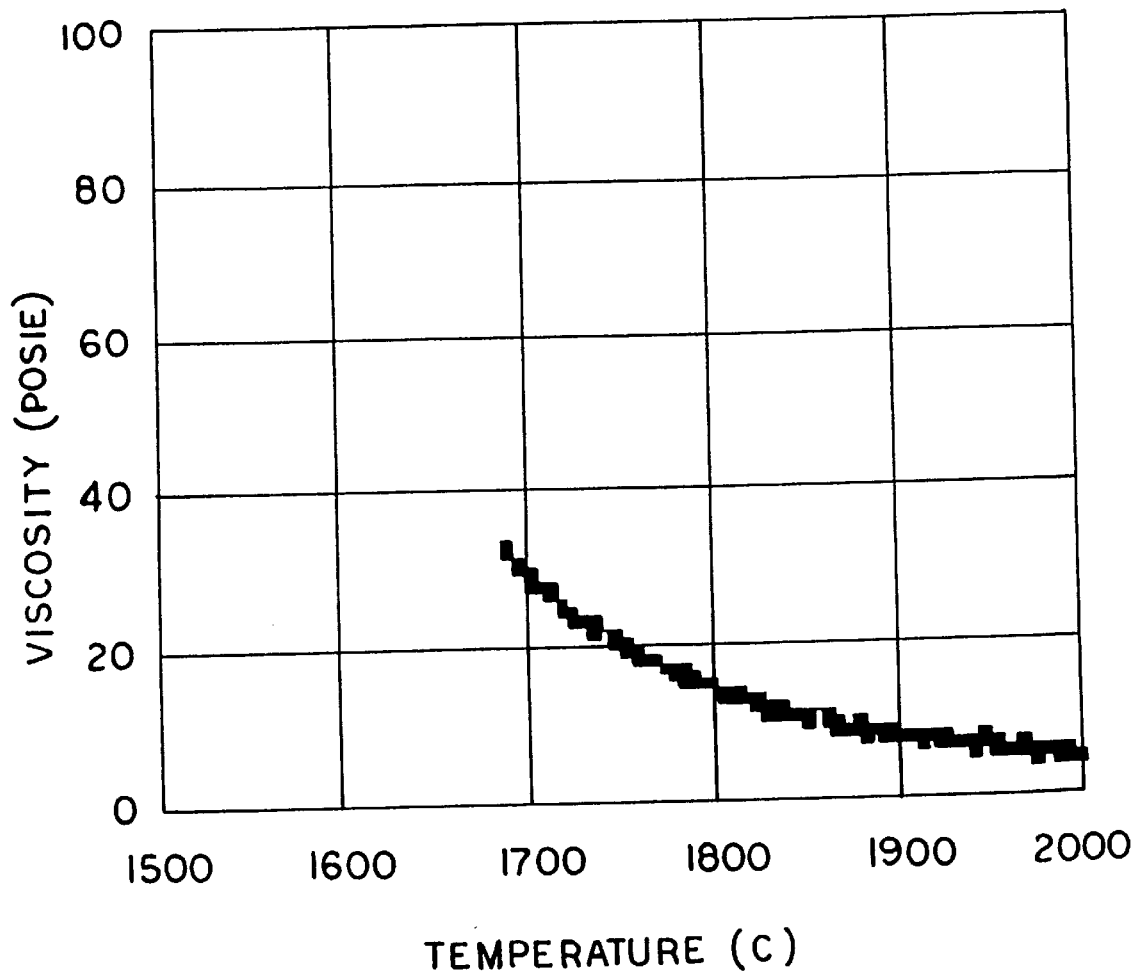
FIG. 1B is a viscosity vs. temperature curve of a melt chemistry for a commercially available, blown aluminosilicate fiber.

One approach to testing whether a fiber of a defined composition can be readily manufactured at an acceptable quality level is to determine whether the viscosity curve of the experimental chemistry matches that of a known product which can be easily fiberized. Such a target viscosity curve is shown in FIG. 1A, being the viscosity curve for a commercially-available spun aluminosilicate fiber, and in FIG. 1B, being the viscosity curve for a commercially-available blown aluminosilicate fiber.

Figure 2:
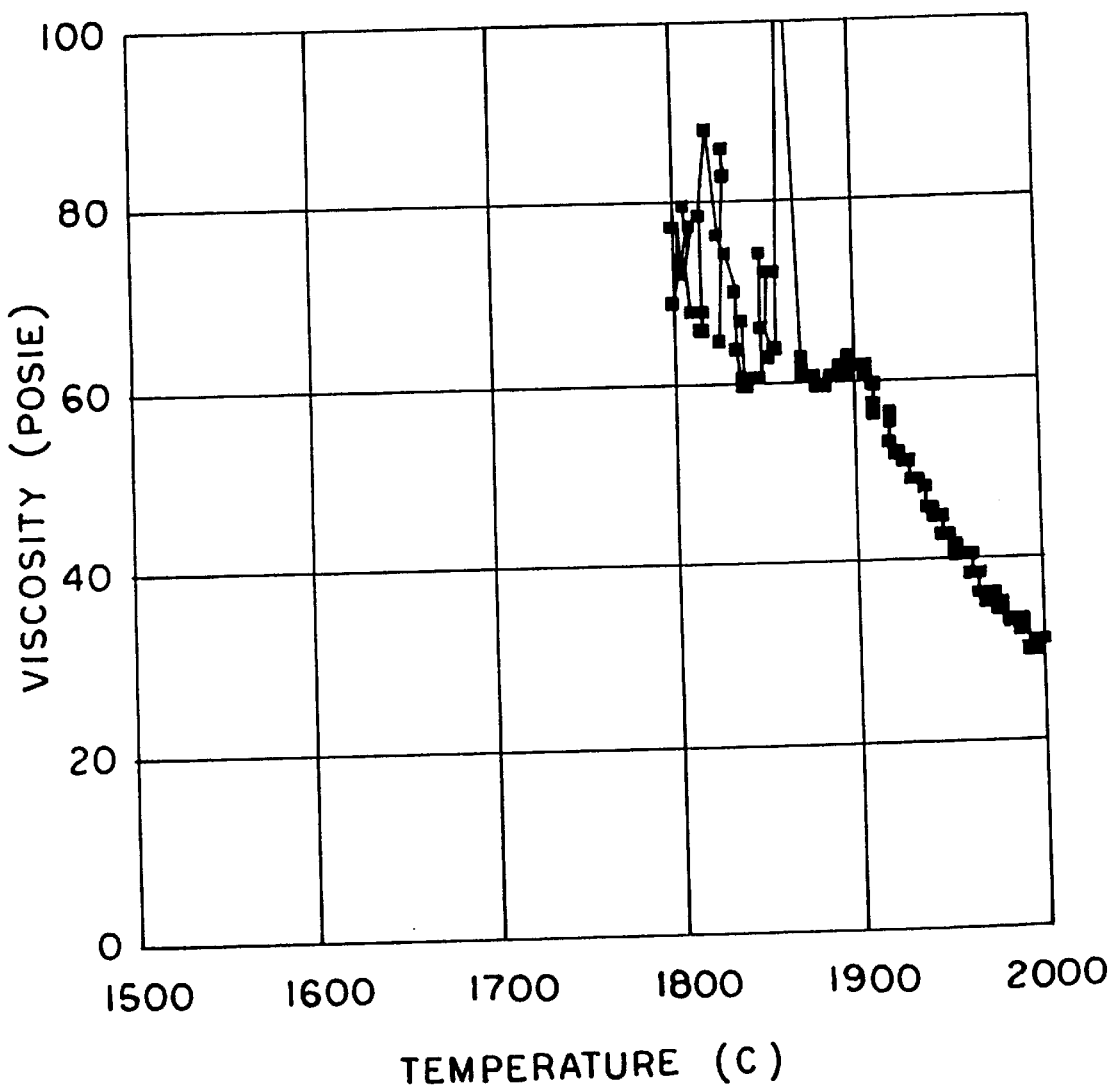
FIG. 2 is a viscosity vs. temperature curve for a magnesia-silica-zirconia fiber melt chemistry having 75% by weight silica.
Figure 3:
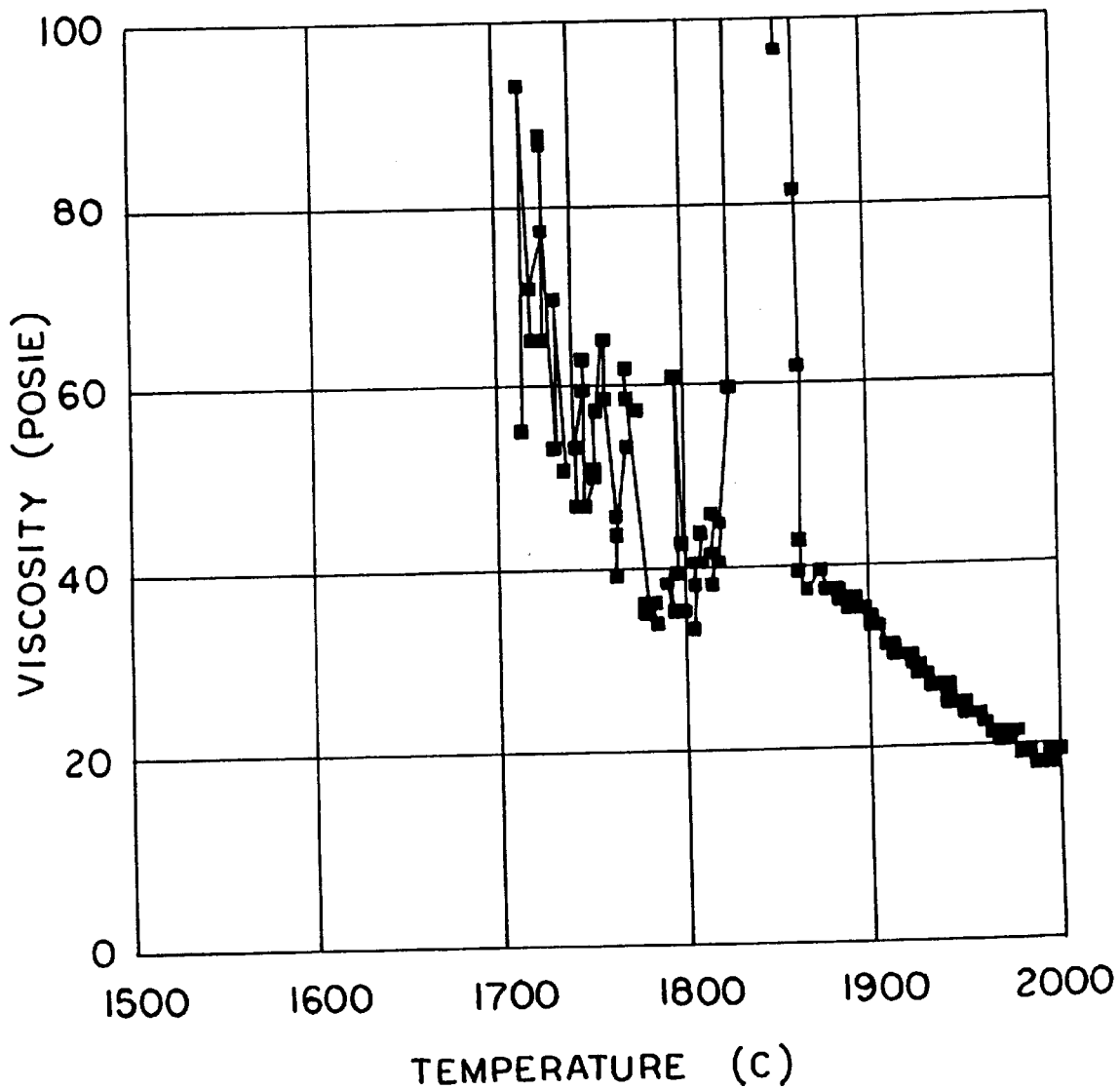
FIG. 3 is a viscosity vs. temperature curve for a magnesia-silica-zirconia fiber melt chemistry having 70% by weight silica.
Figure 4:
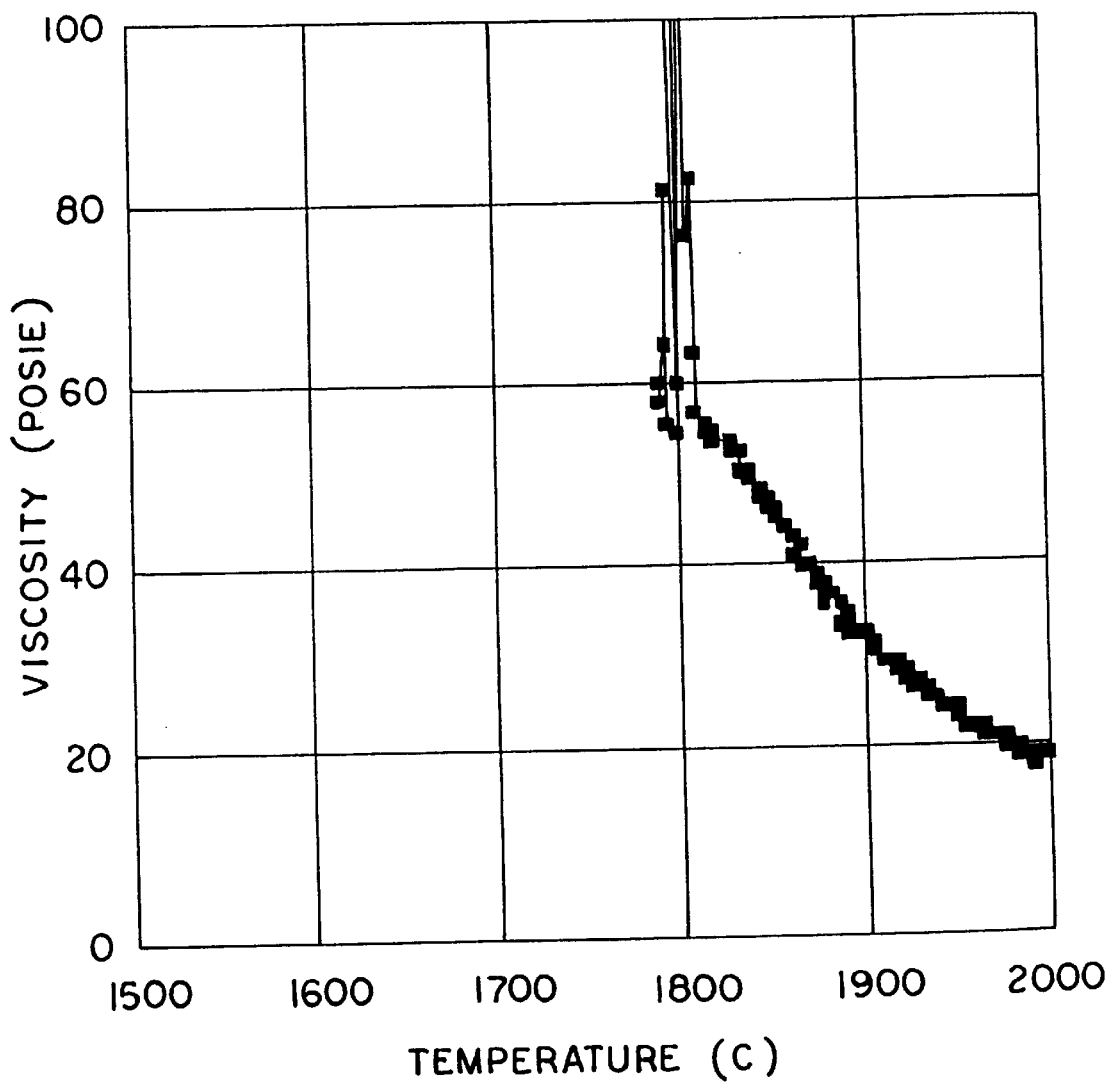
FIG. 4 is a viscosity vs. temperature curve for a magnesia-silica-zirconia fiber melt chemistry having 75% by weight silica and 1 weight percent added alumina.

FIG. 2 shows the viscosity curve for a magnesia-zirconia-silica fiber melt chemistry consisting of 75% $SiO_2$, 5.5% $ZrO_2$ and 19.5% MgO (by weight). The "noisy" area of the curve from 1800–1900° C. is believed to be due to phase separation or the onset of solidification. FIG. 3 shows a similar curve for a 70% $SiO_2$, 5.5% $ZrO_2$, 24.5% MgO melt chemistry. Comparison of FIGS. 2 and 3 shows that dropping the $SiO_2$ level 5% results in a decrease in viscosity; however, neither curve approaches the target viscosity curve of FIG. 1A. FIG. 4 shows the impact of adding 1 weight percent $Al_2O_3$ to the composition of FIG. 2. The small addition of $Al_2O_3$ causes the viscosity curve to be displaced downward and shifts the phase separated region to lower temperatures. Although not shown here, a similar viscosity shift is observed with a small $B_2O_3$ addition (up to about 1 weight percent).

Figure 5:
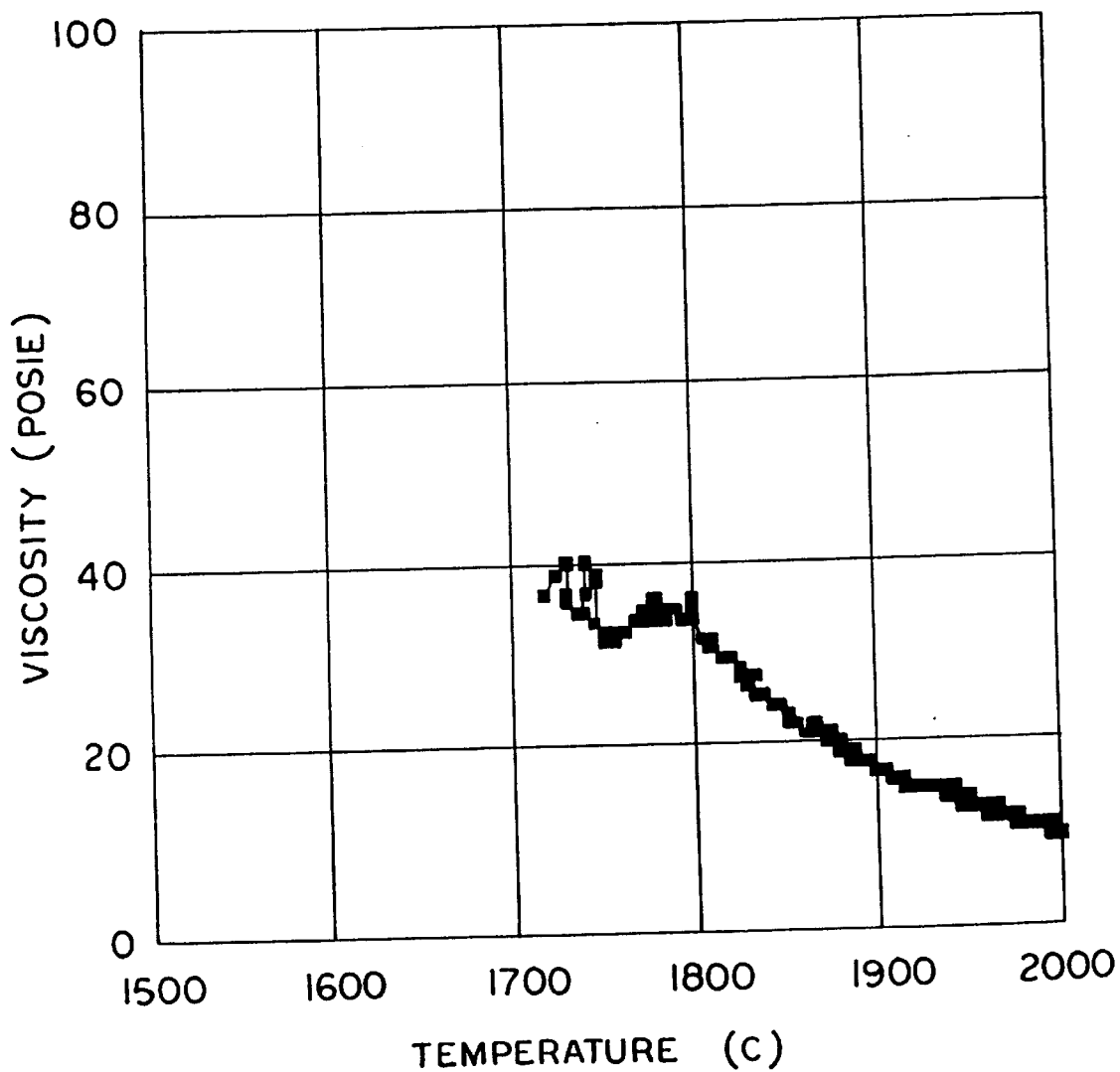
FIG. 5 is a viscosity vs. temperature curve for a preferred magnesia-silica-zirconia fiber melt chemistry having 1 weight percent added alumina.

By adjusting both the $SiO_2$ and $Al_2O_3$ level of a magnesia-zirconia-silica chemistry, it was possible to obtain the viscosity curve shown in FIG. 5 for a 72.3% $SiO_2$, 5.4% $ZrO_2$, 21.3% MgO, 1% $Al_2O_3$ by weight melt chemistry, which is nearly identical in shape between 1800° C. and 2000° C. (the effective spinning range) to the viscosity curve of the aluminosilicate spun chemistry shown in FIG. 1A. At such low levels, $Al_2O_3$ and $B_2O_3$ additions have minimal effect on the fiber performance properties of the present invention, yet are effective in adjusting melt viscosity and improving fiber quality.

Figure 6:
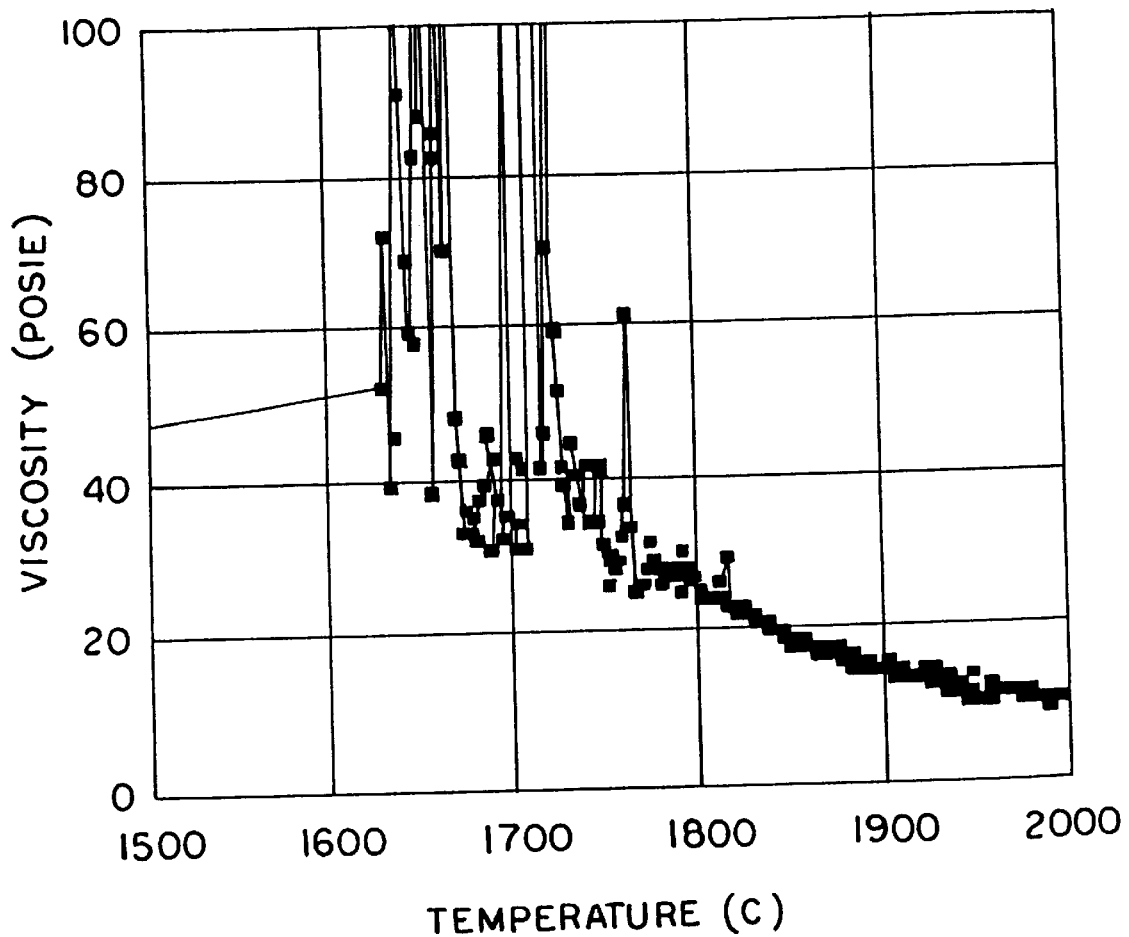
FIG. 6 is a viscosity vs. temperature curve for a preferred magnesia-silica-zirconia fiber melt chemistry.
Figure 7:
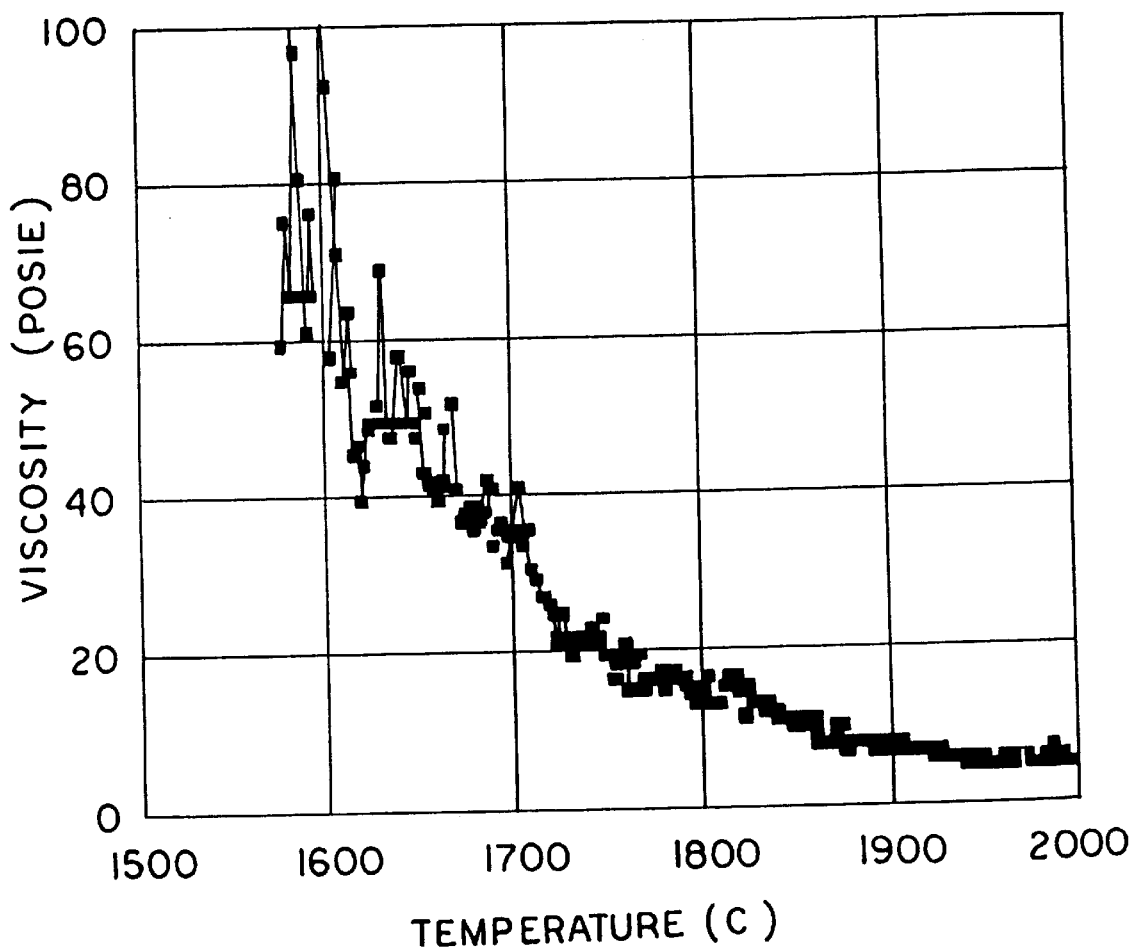
FIG. 7 is a viscosity vs. temperature curve for a preferred magnesia-silica-zirconia fiber melt chemistry.
Figure 8:
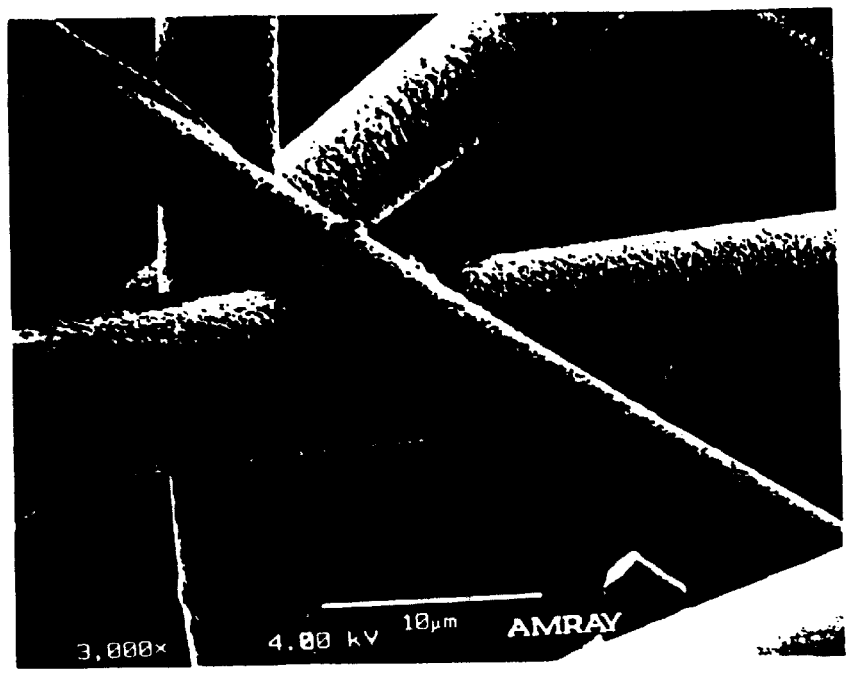
FIG. 8 is a scanning electron micrograph of ceramic fibers comprising aluminum zirconium silicate (AZS) following exposure to 1426° C. for 24 hours.
Figure 9:
FIG. 9 is a scanning electron micrograph of ceramic fibers comprising kaolin following exposure to 1260° C. for 24 hours.
Figure 10:
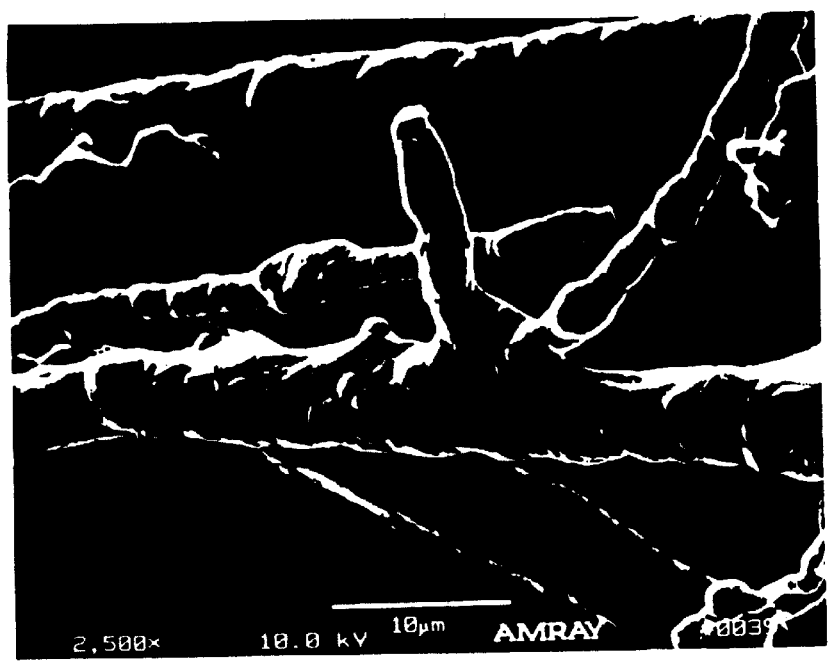
FIG. 10 is a scanning electron micrograph of glass fibers comprising titanium calcium silicate following exposure to 1260° C. for 24 hours.
Figure 11:
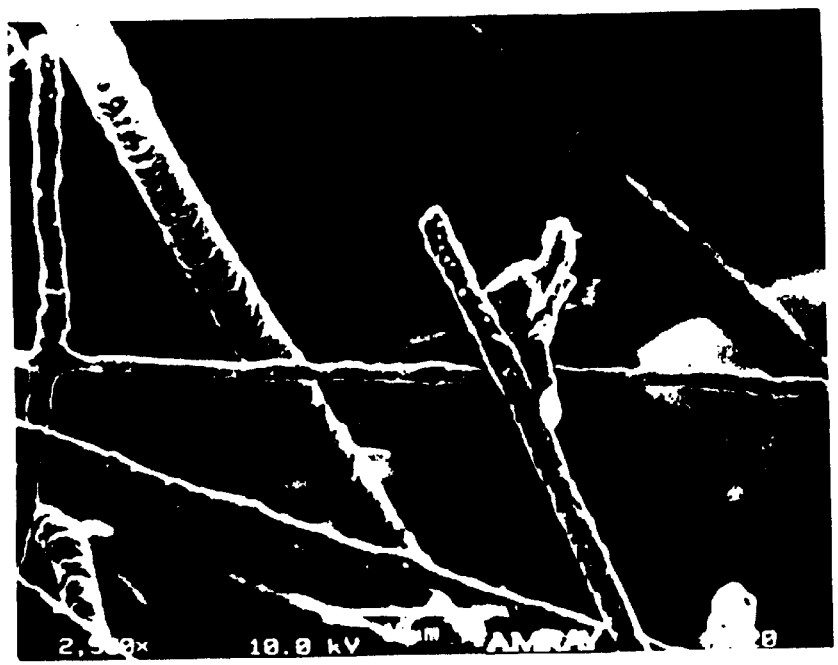
FIG. 11 is a scanning electron micrograph of glass fibers of the present invention following exposure to 1260° C. for 24 hours.

FIG. 6 shows the viscosity curve for a magnesia-zirconia-silica fiber melt chemistry comprising 73.5% silica, 23% magnesia, and 3.5% zirconia, by weight. FIG. 7 shows the viscosity curve for a magnesia-silica fiber melt chemistry comprising 73.5% silica and 26.5% magnesia, by weight. Both these curves approximate the target viscosity curve of FIG. 1B for the commercially-available, blown aluminosilicate fiber. These fiber melt chemistries, according to the present invention, are well suited to fiberization by conventional blowing or spinning techniques.

EXAMPLE 3

Non-durable refractory glass fibers according to the present invention having target shrinkage and mechanical strength characteristics for a service temperature of at Least 1260° C. are suitable to be fiberized from melts which yield the compositions listed in Table II below.

TABLE II

| Composition | A | B | C |
|---|---|---|---|
| $SiO_2$ | 72.3% | 72.2% | 72.2% |
| MgO | 21.3 | 21.2 | 21.2 |
| $ZrO_2$ | 5.4 | 5.3 | 5.3 |
| $Al_2O_3$ | 1.0 | 1.3 | 0.8 |
| $B_2O_3$ | — | — | 0.5 |
| CaO | <1 | <1 | <1 |
| $Fe_2O_3$ | <0.3 | <0.3 | <0.3 |

The non-durable refractory glass fiber, according to the invention, preferably consists essentially of the product of about 65 to about 86 weight percent silica, about 14 to about 35 weight percent magnesia, 0 to about 11 weight percent zirconia, 0 to about 3 weight percent alumina, and 0 to about 2 weight percent boria. Fiber having less than about 2 weight percent alumina exhibits superior properties.

In more preferred ranges, the non-durable refractory glass fiber consists essentially of the product of about 69 to about 80 weight percent silica, about 20 to about 31 weight percent magnesia, 0 to about 7 weight percent zirconia, 0 to about 2 weight percent alumina, and 0 to about 1 weight percent boria.

In most preferred ranges, the non-durable refractory glass fiber consists essentially of the product of about 70 to about 79 weight percent silica, about 20 to about 29 weight percent magnesia, about 1 to about 5 weight percent zirconia, 0 to about 1.5 weight percent alumina, and 0 to about 1 weight percent boria.

In the melt and fibers the present invention, the operable silica level is between about 65 and about 86 weight percent, preferably between about 69 and about 80 weight percent, with the upper level limited only by manufacturability. This is contrary to the teachings in the art, which state that fibers having silica levels above 70% are not manufacturable.

The fibers of the present invention preferably contain substantially no alkali metal, greater than trace impurities. The alkali metal content of these fibers is generally in the range of trace impurities, or hundredths of a percent at most, calculated as alkali metal oxide. Other impurities include calcia, in the amount of less than about 1 weight percent or as low as possible, and iron oxides, in the amount of less than about 0.4 weight percent, calculated as $Fe_2O_3$, or as low as possible.

In a series of test runs, the following refractory fiber compositions were produced by either spinning or blowing techniques, and tested for thermal performance at 1260° C. and solubility in SLF. Individual compositions are listed in Table IIIA, and their thermal performances and solubility data are detailed below in Table IIIB.

TABLE IIIA

| Ex. | MgO | $ZrO_2$ | $SiO_2$ | $Al_2O_3$ | $C_3O$ | $Fe_2O_3$ | $B_2O_3$ |
|---|---|---|---|---|---|---|---|
| 4 | 18.7 | 4.87 | 73.0 | 1.19 | 0.70 | 0.21 | |
| 5 | 22.2 | 0.00 | 72.9 | 1.61 | 0.88 | 0.22 | |
| 6 | 21.4 | 0.95 | 73.7 | 1.71 | 0.81 | 0.21 | |
| 7 | 20.7 | 2.00 | 73.7 | 1.24 | 0.74 | 0.21 | |
| 8 | 20.1 | 3.42 | 73.2 | 1.37 | 0.70 | 0.20 | |
| 9 | 21.2 | 5.3 | 72.2 | 0.8 | <1 | <0.3 | 0.5 |
| 10 | 17.8 | 5.85 | 72.8 | 1.24 | 0.67 | 0.19 | |
| 11 | 17.5 | 6.87 | 72.3 | 1.23 | 0.63 | 0.19 | |
| 12 | 16.9 | 7.29 | 72.3 | 1.19 | 0.57 | 0.17 | |
| Comp 13 | 16.8 | 34.1 | 46.4 | 0.97 | 0.77 | 0.25 | |
| Comp 14 | 21.7 | 24.1 | 51.9 | 0.90 | 0.89 | 0.23 | |
| Comp 15 | 25.5 | 16.9 | 55.7 | 0.76 | 0.77 | 0.24 | |
| Comp 16 | 16.4 | 16.0 | 64.9 | 0.84 | 0.72 | 0.18 | |
| Comp B | -Calcia- | -Titania- | -Silicate- | — | — | — | |
| Comp C | -Alumino- | -Zirconia- | -Silicate- | — | — | — | |
| Comp D | -Kaolin- | — | — | — | — | — | |
| Comp E | -Alumino- | -Silicate- | | | | | |
| 17 | 15.6 | 11.50 | 70.1 | 0.65 | 0.54 | 0.18 | |
| 18 | 21 | 6.00 | 70.3 | 0.54 | 0.69 | 0.27 | |
| 19 | 20.9 | 5.78 | 70.7 | 0.23 | 0.68 | 0.24 | |
| Comp 20 | 21.3 | 12.14 | 64.6 | 0.42 | 0.63 | 0.26 | |
| 21 | 24.9 | 5.78 | 66.8 | 0.23 | 0.79 | 0.27 | |
| 22 | 14.6 | 5.27 | 78.0 | 0.20 | 0.57 | 0.18 | |
| 23 | 11.9 | 10.50 | 75.8 | 0.29 | 0.52 | 0.17 | |
| 24 | 21.2 | 0.00 | 76.8 | 0.20 | 0.90 | 0.24 | |
| 25 | 20.8 | 5.7 | 71.7 | 1.19 | 0.28 | 0.34 | |
| 26 | 21.5 | 2.0 | 74.9 | 1.09 | 0.40 | 0.35 | |
| 27 | 21.4 | 3.4 | 73.2 | 1.02 | 0.38 | 0.27 | |
| 28 | 20.4 | 6.9 | 70.4 | 1.02 | 0.38 | 0.24 | |
| 29 | 19.7 | 5.5 | 72.2 | 0.3 | 0.67 | 0.35 | 0.9 |
| 30 | 20.2 | 5.5 | 71.6 | 0.3 | 0.30 | 0.24 | 0.8 |
| 31 | 20.6 | 5.54 | 71.8 | 1.13 | 0.46 | 0.37 | |
| 32 | 22.2 | 5.6 | 70.7 | 1.26 | 0.29 | 0.34 | |
| 33 | 22.8 | 5.5 | 70.1 | 0.56 | 0.22 | 0.36 | |
| 34 | 21.5 | 5.32 | 69.8 | 2.88 | 0.23 | 0.15 | |
| 35 | 19.6 | 5.4 | 72.6 | 1.8 | 0.36 | 0.25 | |
| 36 | 20.2 | 5.5 | 72.1 | 1.4 | 0.34 | 0.25 | |
| 37 | 20.2 | 5.7 | 72.4 | 1.10 | 0.40 | 0.25 | 0.2 |
| 38 | 20.5 | 5.5 | 72.3 | 0.91 | 0.40 | 0.25 | 0.3 |
| 39 | 20.7 | 5.4 | 72.9 | 0.66 | 0.43 | 0.17 | 0.7 |

TABLE IIIB

| Example | Shrinkage (%) 1260° C./ 24 Hrs | Shrinkage (%) 1260° C./ 168 Hrs | Grain Size (microns) | Compression Strength (psi) | Compression Recovery (%) | Solubility (ng/ $cm^2$-Hr) |
|---|---|---|---|---|---|---|
| 4 | 4.3 | 4.8 | 1.2 | 12.8 | 10.6 | 60.4 |
| 5 | 4.1 | 5.2 | 1.3 | 16.2 | 5 | 327 |
| 6 | | | | | | |
| 7 | 6.1 | 7.6 | | 16.9 | 7.9 | 142 |
| 8 | | | | | | 87.7 |
| 9 | | | | 7.2 | 4.5 | |
| 10 | | | | | | 46.6 |
| 11 | 4.0 | 4.3 | | 14.3 | 10.6 | 33.0 |
| 12 | 3.4 | 3.5 | 0.8 | 10.2 | 8.4 | 44.9 |
| Comp 13 | 13.1 | 16.0 | | 39 | 6.7 | 7.3 |
| Comp 14 | 23.4 | | | 107.8 | 4.4 | 93.4 |
| Comp | >25.0 | | | | | |

6,025,288

TABLE IIIB-continued

| Example | Shrinkage (%) 1260° C./ 24 Hrs | Shrinkage (%) 1260° C./ 168 Hrs | Grain Size (microns) | Compression Strength (psi) | Compression Recovery (%) | Solubility (ng/ cm²-Hr) |
|---|---|---|---|---|---|---|
| 15 | | | | | | |
| Comp 16 | 8.2 | 7.2 | | 17.2 | 8.7 | 9.7 |
| Comp B | | | 2.4 | 1.1 | 1.4 | |
| Comp C | | | 0.2 | 4.5 | 11.5 | |
| Comp D | | | 0.3 | 7.5 | 12.1 | |
| Comp E | | | | 6.9 | 24.3 | |
| 17 | | | 1.9 | | | 32.9 |
| 18 | | | 1.6 | | | 76.8 |
| 19 | | | 1.2 | | | 87.8 |
| Comp 20 | | | 3.5 | | | 24.7 |
| 21 | | | 1.2 | | | 84.9 |
| 22 | | | 1.0 | | | 98.6 |
| 23 | | | 0.8 | | | 33.3 |
| 24 | | | 0.7 | | | Too rapid to measure |
| 25 | 3.3 | | | 12.1 | 14.1 | |
| 26 | 5.7 | | | 16.3 | 11.2 | |
| 27 | 6.0 | | | 18.2 | 11.6 | |
| 28 | 3.8 | | | 16.4 | 15.5 | |
| 29 | 5.72 | | | 4 | 3 | 189 |
| 30 | 5.11 | | | 6.4 | 3.8 | 171 |
| 31 | 4.6 | | | 10.9 | 6.9 | 40.7 |
| 32 | 5.58 | | | 13.3 | 4.6 | 182 |
| 33 | 6.09 | | | 13.4 | 4.8 | 226 |
| 34 | 3.93 | | | 12.4 | 8 | 47 |
| 35 | 4.52 | | | 13.2 | 11.0 | |
| 36 | 4.58 | | | 16.8 | 13.8 | |
| 37 | 3.5 | | | 11.3 | 13.9 | |
| 38 | 3.9 | | | 11.5 | 9.1 | |
| 39 | 5.6 | | | 9.7 | 7 | |

Tests conducted on the zirconia-containing magnesium silicate fiber of Example 4 revealed that the fiber exhibited a shrinkage of only 4.3% after 24 hours at 1260° C., a dissolution rate of 60.4 ng/cm²-hr, and mechanical integrity which compares favorably to that of similarly treated, high mechanical strength conventional refractory ceramic fiber (Comparative Examples C, D and E). Other examples within the present invention demonstrating low shrinkage at use or service temperature include Examples 5–8, 10–12 and 25–39. Comparative Examples 13–16, with compositional ranges outside of the present invention demonstrate much higher shrinkage at service temperature.

We have identified particular non-durable refractory glass fibers, according to the present invention, which exhibit very low shrinkage, on the order of about 4.5% or lower after exposure to service temperature, and which have been manufactured from a melt having alumina as a viscosity modifier, having a composition within the range of about 69.75 to about 73.5 weight percent silica, about 16.75 to about 22.25 weight percent magnesia, 0 to about 7.5 weight percent zirconia, and about 1 to about 3 weight percent alumina.

We have further identified particular non-durable refractory glass fibers, according to the present invention, which exhibit very low shrinkage, on the order of about 4.5% or lower after exposure to service temperature, and which have been manufactured from a melt having alumina and boria as viscosity modifiers, having a composition within the range of about 71.5 to about 73.5 weight percent silica, about 19 to about 21.5 weight percent magnesia, about 5 to about 6 weight percent zirconia, and about 0.5 to about 2 weight percent alumina, and about 0.2 to about 1 weight percent boria.

The after-service microstructure of fibers prepared according to the present invention, as represented by Example 12 reported in Table III above, was tested for grain size according to the test procedure set forth above after exposure to a temperature of 1260° C. This was compared to the test results for the titania-containing calcium silicate fiber having the composition of Comparative Example B, above, and the refractory AZS (Comparative Example C) and kaolin (Comparative Example D) ceramic fibers.

The results of the tests are represented by the micrographs of FIGS. 8–13. The titania-calcium-silicate fiber of Comparative Example B (FIG. 10), being extremely friable, exhibited significant surface roughness and large surface crystal grain size as compared to both the conventional refractory ceramic fibers of Comparative Examples C (FIG. 8) and D (FIG. 9), and Example 12, a fiber of the present invention (FIG. 11) which exhibited a smoother surface and relatively smaller surface crystallites. Surface roughness and large surface crystals are undesirable, being associated with fiber friability and low mechanical strength.

The SLF-soluble fibers of the present invention, however, having significantly reduced after-service friability, exhibited very fine grained microstructure, having crystal grain sizes generally on the order of 1.9 microns or less as shown in Table III, Examples 4, 5, 12, 17–19, and 21–24. Comparative Example B, which is a titania-calcium-silicate fiber, and Comparative Example 20, which is a magnesia-zirconia-silicate outside the compositional range of the present invention, demonstrated a much larger grained after-service microstructure.

Figure 12:
FIG. 12 is a scanning electron micrograph of a cross section of glass fibers of the present invention.
Figure 13:
FIG. 13 is a scanning electron micrograph of a cross section of ceramic fibers comprising aluminum zirconium silicate (AZS).

FIG. 12 demonstrates in cross section the small-grained crystallites, both in absolute terms and with reference to the diameter of the fiber, present in a fiber of the present invention after exposure to a service temperature of 1260° C. for 24 hours. This high mechanical strength fiber is comparable in crystallite size to the very strong AZS fiber, shown in cross section in FIG. 13, after exposure to a service temperature of 1426° C. for 24 hours.

In a further series of test runs, the following refractory fiber compositions were produced by the blowing technique and tested for thermal performance at 1260° C. and solubility in SLF. Individual compositions are listed in Table IVA, and their thermal performances and solubility results are detailed below in Table IVB.

TABLE IV A

| Example No. | Composition SiO₂ | CaO | MgO | ZrO₂ | Al₂O₃ | F/I | DIAM. |
|---|---|---|---|---|---|---|---|
| 40 | 67.52 | 0.27 | 30.57 | 0.58 | 0.92 | 52 | 1.0 |
| 41 | 70.07 | 0.30 | 23.07 | 5.97 | 0.48 | 25 | 1.6 |
| 42 | 68.63 | 0.30 | 29.75 | 0.58 | 0.62 | 32 | 1.2 |
| 43 | 73.87 | 0.15 | 19.05 | 6.03 | 0.84 | 26 | 5.1 |
| 44 | 75.75 | 0.27 | 23.43 | 0.01 | 0.47 | 40 | 2.4 |
| 45 | 75.62 | 0.27 | 23.58 | 0.01 | 0.43 | 35 | 3.6 |
| 46 | 76.63 | 0.19 | 19.40 | 3.33 | 0.40 | 40 | 8.5 |
| 47 | 67.53 | 0.25 | 30.26 | 0.01 | 1.86 | 40 | 1.4 |
| 48 | 77.30 | 0.15 | 15.91 | 5.82 | 0.76 | 30 | 11.3 |
| 49 | 76.08 | 0.28 | 23.16 | 0.01 | 0.40 | 43 | 3.6 |
| 50 | 68.09 | 0.24 | 27.77 | 3.36 | 0.45 | 37 | 1.4 |
| 51 | 72.67 | 0.18 | 23.20 | 3.46 | 0.41 | 46 | 2.0 |
| 52 | 76.61 | 0.15 | 19.53 | 3.32 | 0.34 | 35 | 7.7 |
| 53 | 72.67 | 0.18 | 23.20 | 3.46 | 0.41 | 46 | 2.0 |

TABLE IV A-continued

| Example No. | Composition SiO$_2$ | CaO | MgO | ZrO$_2$ | Al$_2$O$_3$ | F/I | DIAM. |
|---|---|---|---|---|---|---|---|
| 54 | 71.55 | 0.16 | 22.46 | 3.1 | 2.65 | 41 | 3.5 |
| 55 | 71.71 | 0.15 | 23.13 | 3.3 | 0.65 | 35 | 3.6 |
| 56 | 71.86 | 0.29 | 27.32 | 0.00 | 0.32 | 56 | 1.3 |
| 57 | 72.19 | 0.18 | 27.1 | 0 | 0.45 | 28 | 1.7 |
| 58 | 72.24 | 0.18 | 27.19 | 0 | 0.32 | 27 | 2.3 |
| 59 | 71.82 | 0.17 | 26.65 | 0 | 1.3 | 30 | 3.6 |

F/I = Fiber Index

TABLE IV B

| Example No. | Shrink 1260° C./ 24 hrs | Shrink 1260° C./ 168 hrs | C.S. at 1260° C./ 24 hrs | C.S. at 1260° C./ 168 hrs | C.R. at 1260° C./ 24 hrs | C.R. at 1260° C./ 168 hrs | Delta Shrink | K |
|---|---|---|---|---|---|---|---|---|
| 40 | 9.2 | 17.5 | 18.4 |  | 11.1 |  | 8.3 | 875+ |
| 41 | 7.3 | 10.3 | 17.3 | 18.5 | 10.0 | 5.2 | 3.0 | 100 |
| 42 | 2.0 | 14.2 | 6.9 | 22.3 | 17.3 | 4.5 | 12.2 | 826+ |
| 43 | 4.5 | 4.4 | 11.5 | 8.5 | 8.9 | 6.1 | 0.0 | 59 |
| 44 | 5.6 | 5.3 | 15.8 | 11.9 | 8.9 | 7.5 | 0.0 | 1450+ |
| 45 | 6.0 | 5.5 | 11.8 | 9.8 | 8.5 | 6.1 | 0.0 | 863 |
| 46 | 4.1 | 5.9 | 23.8 | 15.3 | 7.8 | 5.2 | 1.8 | 280 |
| 47 | 7.7 | 12.5 | 14.2 | 21.6 | 9.8 | 6.3 | 4.8 | 763+ |
| 48 | 5.3 | 6.2 | 11.5 | 8.5 | 9.9 | 4.8 | 0.9 | 54 |
| 49 | 4.3 | 4.0 | 10.9 | 6.8 | 6.4 | 6.8 | 0.0 | 1117 |
| 50 | 7.5 | 10.0 | 15.7 | 13.5 | 8.9 | 5.0 | 2.5 | 402 |
| 51 | 4.2 | 4.8 | 15.4 | 10.7 | 12.2 | 7.6 | 0.6 | 368 |
| 52 | 6.0 | 6.1 | 19.4 | 14.4 | 9.0 | 3.4 | 0.1 | 254 |
| 53 | 4.2 | 4.8 | 15.4 | 10.7 | 12.2 | 7.6 | 0.6 | 368 |
| 54 | 4.3 | 4.8 | 10.8 | 5.7 | 10.8 | 4.2 | 0.5 | 233 |
| 55 | 4.3 | 8 | 12.5 | 5.8 | 16.8 | 3.4 | 3.7 | 328 |
| 56 | 7.2 | 10.2 | 12.5 | 16.3 | 12.9 | 9.0 | 3.0 | 712+ |
| 57 | 5.3 | 6.1 | 15.1 | 9.0 | 7.9 | 3.7 | 0.8 | 863 |
| 58 | 5.6 | 6.4 | 13 | 6.8 | 7.3 | 3.0 | 0.8 | 863 |
| 59 | 3.4 | 7.7 | 16.9 | 28.2 | 14.3 | 9.7 | 4.3 | 612 |

C.S.= Compression Strength (psi)
C.R.= Compression Recovery (%)
K= Solubility (ng/cm$^2$/hr)

For the non-durable fibers according to the present invention, prepared by fiber blowing techniques, the best thermal performance results are exhibited by fibers blown from melt compositions containing about 70% silica and greater, having a fiber index of about 35 or greater, and a diameter of about two microns or greater. This performance is obtained with fiber diameters up to about 10 microns, although the only practical upper limit for fiber diameter according to the present invention is the ability to spin or blow product having the desired diameter.

Particularly preferred compositions for forming fibers from the melt include about 70 to about 77.5 weight percent silica, about 15.5 to about 30 weight percent magnesia, and 0 to about 6 weight percent zirconia. A suitable melt composition for forming fiber product is about 73.5 weight percent silica, about 23 to about 26.5 weight percent magnesia, 0 to about 3.5 weight percent zirconia, and impurities in the range of about 0.15 to about 0.3 weight percent calcia and about 0.32 to about 1.86 weight percent, generally about 0.32 to about 0.92 weight percent alumina. These fibers exhibit excellent shrinkage characteristics, as shown by the shrinkage data in Table IV B, including the Delta Shrink property, or the difference in shrinkage between one day and one week at the service temperature. The fibers also exhibit significant solubility in SLF, as demonstrated in Table IV B. Solubilities of 54 to over 1450 ng/cm$^2$-hr were measured by the technique described above. (The "+" in the Table indicates an extremely rapid fiber dissolution rate which was not amenable to direct calculation. The value reported is the lower limit of the dissolution rate for the sample.)

High temperature resistant magnesium silicate fibers, as shown in Table V, comprising a low weight percentage of zirconia and alumina were tested for fiber shrinkage at 1260° C. for 24 hours and for fiber dissolution rate (solubility) in simulated lung fluid (SLF) at physiological temperatures.

The high temperature resistant magnesium silicate fiber compositions, of examples 62–64, within the preferred range of about 75 to about 76.5 weight percent silica, about 21 to about 23.5 weight percent magnesia, 0 weight percent zirconia and less than about 1.5 weight percent alumina exhibited a fiber shrinkage of less than about 6 percent at 1260° C. for 24 hours. These results show a significant decrease in fiber shrinkage over comparative example 61, a magnesium silicate fiber composition comprising 67.5 weight percent silica and 30 weight percent magnesia, 0.6 weight percent zirconia and 0.9 weight percent alumina.

The data further reveals that the dissolution rate, that is, fiber solubility in simulated lung fluid (SLF) at physiological temperature, for the fiber compositions of examples 62–64, is greater than 1180 ng/cm$^2$-hr.

TABLE V

| Example | SiO$_2$ | MgO | ZrO$_2$ | Al$_2$O$_3$ | SHRINK 1260°/ 24 hr | SOLU-BILITY ng/ cm$^2$-hr | 24 Hr. Compression Recovery |
|---|---|---|---|---|---|---|---|
| 60 | 71.9 | 27.3 | 0.0 | 0.3 | 7.2 | 1219 | 12.9 |
| Comp. 61 | 67.5 | 30.6 | 0.6 | 0.9 | 9.2 | 1036 | 11.1 |
| 62 | 75.8 | 23.4 | 0.0 | 0.5 | 5.6 | 1721 | 8.9 |
| 63 | 75.6 | 23.5 | 0.0 | 0.4 | 6.0 | 1180 | 8.5 |
| 64 | 76.1 | 23.2 | 0.0 | 0.4 | 4.3 | 1370 | 6.4 |

The high temperature resistant magnesium silicate fiber composition comprising about 71 to about 76.5 weight percent silica, about 21.5 to about 27.5 weight percent magnesia, 0 to about 5 weight percent zirconia and 0 to about 2.5 weight percent alumina, as shown in Table VI, were evaluated for fiber shrinakge at 1260° C. for 24 hours, and for fiber solubility rate in simulated lung fluid (SLF).

The high temperature resistant fiber composition of example 65–72 comprising about 71.7 about 72.7 weight percent silica, about 21.5 to about 22.5 weight percent magnesia, and a combined weight percent of zirconia and alumina of about 5 percent, exhibit a fiber shrinkage of less than 3.6 percent.

Comparative example 73 is a high temperature resistant magnesium silicate fiber composition comprising 68.1 weight percent silica, 27.8 weight percent magnesia, 3.4 weight percent zirconia and 1.4 weight percent alumina. The weight percent of silica is below the preferred limit of the present invention, while the weight percent of magnesia is higher than the preferred limit. Shrinkage at the use temperature is unacceptable for many applications, at 7.5%.

The high temperature resistant magnesium silicate fiber compositions of examples 74–90 are within a preferred range of about 71 to about 75 weight percent silica, about 22.5 to about 25 weight percent magnesia, and a combined weight percent of zirconia and alumina of about 0.25 to about 4.25 percent. The fiber compositions of examples 74–90 exhibit a fiber shrinkage of generally less than 6 percent, and a fiber solubility rate of greater than 100 ng/cm²-hr.

These results demonstrate that the high temperature resistant magnesium silicate fiber composition of examples 74–90, comprising a combined weight percent of zirconia and alumina of about 0.25 to about 4.25 percent, exhibit a significant increase in the fiber solubility rate over other high temperature resistant magnesium silicate fiber compositions.

TABLE VI

| Example | SiO$_2$ | MgO | ZrO$_2$ | Al$_2$O$_3$ | SHRINK 1260°/ 24 hr | SOLU-BILITY ng/ cm²-hr | 24 Hr. Compression Recovery |
|---|---|---|---|---|---|---|---|
| 65 | 71.7 | 22.4 | 3.6 | 1.4 | 2.6 | 55 | 19.5 |
| 66 | 71.7 | 22.4 | 3.6 | 1.4 | 3.0 | 55 | 17.3 |
| 67 | 72.1 | 22.3 | 3.5 | 1.4 | 2.5 | 74 | 24.5 |
| 68 | 72.4 | 22.1 | 3.4 | 1.4 | 3.6 | 37 | 23.4 |
| 69 | 72.7 | 21.8 | 3.4 | 1.4 | 2.8 | 44 | 26.1 |
| 70 | 72.7 | 21.6 | 3.6 | 1.4 | 1.8 | 68 | 17.9 |
| 71 | 72.7 | 21.6 | 3.6 | 1.4 | 3.2 | 56 | 20.5 |
| 72 | 72.7 | 21.6 | 3.6 | 1.4 | 2.2 | 52 | 17.4 |
| Comp. 73 | 68.1 | 27.8 | 3.4 | 0.5 | 7.5 | 424 | 8.9 |
| 74 | 72.7 | 23.3 | 3.5 | 0.4 | 4.2 | 386 | 12.2 |
| 75 | 72.4 | 22.9 | 3.7 | 0.3 | 4.8 | 150 | 18.1 |
| 76 | 72.4 | 22.9 | 3.7 | 0.3 | 4.9 | 150 | 14.9 |
| 77 | 72.4 | 22.9 | 3.7 | 0.3 | 4.6 | 150 | 14.5 |
| 78 | 71.8 | 23.4 | 3.7 | 0.4 | 6.4 | 130 | 18.6 |
| 79 | 71.8 | 23.4 | 3.7 | 0.4 | 5.8 | 130 | 18.3 |
| 80 | 72.4 | 22.9 | 3.7 | 0.5 | 4.6 | 149 | 16.3 |
| 81 | 72.4 | 22.9 | 3.7 | 0.5 | 4.3 | 149 | 17.4 |
| 82 | 72.6 | 22.9 | 3.7 | 0.3 | 4.8 | 162 | 20.8 |
| 83 | 72.6 | 22.9 | 3.7 | 0.3 | 4.3 | 162 | 15.5 |
| 84 | 71.8 | 25.1 | 1.8 | 0.4 | 5.6 | 186 | 17.7 |
| 85 | 71.9 | 23.3 | 3.5 | 0.4 | 3.1 | 284 | 17.5 |
| 86 | 71.9 | 23.2 | 3.5 | 0.5 | 5.5 | 201 | 16.3 |
| 87 | 74.5 | 23.4 | 0.0 | 1.4 | 2.5 | 130 | 27.0 |
| 88 | 74.7 | 23.0 | 0.0 | 1.4 | 1.7 | 372 | 22.6 |
| 89 | 74.7 | 23.0 | 0.0 | 1.4 | 2.3 | 345 | 23.9 |
| 90 | 74.7 | 22.7 | 3.5 | 1.4 | 2.2 | 52 | 28.1 |

Examples 91 through 93 tested blankets comprised of high temperature resistant magnesium silicate fiber compositions, within the range of about 75 to about 76.5 weight percent silica, about 21 to about 23.5 weight percent magnesia, 0 weight percent zirconia and up to 1.5 to 2 weight percent alumina. The fiber blankets were prepared by using a needling process in which a mat of lubricated fiber is penetrated by felting needles. The felting needles are equipped with small barbs which increase fiber entanglement. After needling, the mat is heated to drive off the remaining lubricant. The needling process results in a higher tensile strength mat which is known as a fiber "blanket". The fiber blanket product was evaluated for fiber shrinkage and solubility rate of fiber mass in a solution of simulated lung fluid (SLF) at physiological temperature.

The fiber blankets of examples 91 through 93 comprising high temperature resistant magnesium silicate fibers, as shown in Table VII, exhibited a fiber shrinkage of only about 4% at 1260° C. for 24 hours. Furthermore, the blanket comprising high temperature resistant magnesium silicate fibers in which the combined weight percent of alumina and zirconia is less than 4.25, namely 1.5 percent, exhibit a fiber solubility rate in simulated lung fluid greater than 70, and up to 198 ng/cm²-hr, which is a significant increase in the fiber solubility rate over comparative example 94, in which the fiber consists essentially of the product of 68.7 weight percent silica, about 24.5 weight percent magnesia and a combined weight percent of alumina and zirconia of about 6, and exhibiting a fiber solubility rate of less than 17 ng/cm²-hr.

The fiber blanket of comparative example 94 failed its performance tests due to high fiber shrinkage and low dissolution rate of fiber mass in simulated lung fluid at physiological temperature. The weight percentage of alumina in the fiber was higher than the upper limit for the fibers of the present invention, while silica was below the lower limit.

The data demonstrates that a preferred fiber composition of the present invention is about 75 to about 76.5 weight percent silica about 21 to about 23.5 weight percent magnesia, and a combined weight percent of zirconia and alumina of less than about 4.25 percent.

TABLE VII

| Example | SiO$_2$ | MgO | ZrO$_2$ | Al$_2$O$_3$ | SHRINK 1260°/ 24 hr | SOLU-BILITY ng/ cm²-hr | 24 Hr. Compression Recovery |
|---|---|---|---|---|---|---|---|
| 91 | 75.6 | 21.9 | 0.0 | 1.7 | 3.2 | 70 | 22 |
| 92 | 76.0 | 21.7 | 0.0 | 1.4 | 3.7 | 198 | 18 |
| 93 | 75.4 | 22.6 | 0.0 | 1.4 | 4.0 | 185 | |
| Comp. 94 | 68.7 | 24.5 | 3.6 | 2.3 | 2.8 | 17 | 14.2 |

The non-durable, low shrinkage, refractory glass fibers of the present invention compare favorably with conventional kaolin, AZS, and aluminosilicate durable refractory ceramic fibers in terms of mechanical strength after exposure to service temperature. Fibers of the present invention generally tested in a range comparable to kaolin fibers for the 50% compression strength test and the compression recovery test. The fibers of the present invention exhibit significantly improved mechanical strength, measured as compression strength and compression recovery, compared to the titania-calcium-silicate fiber of Comparative Example B.

The refractory glass fiber according to the present invention, consisting essentially of magnesium silicate modified by the addition of particular percentages of zirconia and optionally, viscosity modifier additives, such as Al$_2$O$_3$ and B$_2$O$_3$, and exhibiting fine grained microstructure after exposure to service temperatures of 1260° C., is up to 150 times more soluble in simulated lung fluid than standard refractory ceramic fiber and is capable of withstanding temperatures greater than 1000° C., up to 1260° C. with less than 6% linear shrinkage.

The SLF-soluble fibers of the present invention, exhibited significantly reduced after service friability, namely high mechanical strength, compared to the very stable SLF-durable aluminosilicate and alumino-zirconia-silicate fibers. The fibers of the present invention generally exhibit fine microstructure, and exhibit low friability and high mechanical strength, as well as low shrinkage upon exposure to the service temperature and high solubility in SLF.

The inventive fiber, therefore, retains the beneficial use characteristics of conventional refractory ceramic fiber, such as aluminosilicate fibers, namely undergoing limited shrinkage at high use temperatures. The inventive refractory glass fiber shrinks less than about 6% at a use temperature of 1260° C., and retains good mechanical strength after service. The inventive fiber exhibits low after-service friability, exhibiting a small scale or fine grained microstructure after initial exposure to service temperature and high compression strength and compression recovery.

The fiber of the present invention may be manufactured with existing fiberization technology and formed into multiple products, including but not limited to bulk fibers, fiber-containing blankets, papers, felts, vacuum cast shapes and composites. The fiber of the present invention can be used in combination with conventional materials utilized in the production of fiber-containing blankets, vacuum cast shapes and composites, as a substitute for conventional fibers. The fiber of the present invention may be used alone or in combination with other materials, such as binders and the like, in the production of fiber-containing paper and felt. In addition to the advantages over conventional refractory ceramic fiber, the inventive fiber is 4 to 150 times more soluble in the simulated lung fluid, thus minimizing concerns over fiber inhalation.

Thus, the objects of the invention are accomplished by the present invention, which is not limited to the specific embodiments described above, but which includes variations modifications and equivalent embodiments defined by the following claims.

We claim:

1. A low shrinkage, high temperature resistant glass fiber having a use temperature up to at least 1260° C., which maintains mechanical integrity after exposure to the use temperature and which is non-durable in physiological fluids, comprising a fiberization product of from about 69 to about 80 weight percent silica, from about 20 to about 31 weight percent magnesia, 0 to about 7 weight percent zirconia, a viscosity modifier in an amount effective to render the product fiberizable, less than 1 weight percent CaO, less than 0.4 weight percent $Fe_2O_3$ and substantially no alkali metal oxide.

2. The fiber of claim 1, wherein the fiber comprises the fiberization product of about 71 to about 78 weight percent silica, about 20 to about 27.5 weight percent magnesia, 0 to about 5 weight percent zirconia.

3. The fiber of claim 1, wherein the fiber comprises the fiberization product of about 71 to about 76.5 weight percent silica, about 21.5 to about 27.5 weight percent magnesia, 0 to about 4 weight percent zirconia.

4. The fiber of claim 1, wherein said fiber exhibits a shrinkage of less than about 4.5% at 1260° C.

5. The fiber of claim 1, wherein the fiber contains less than about 1.5 weight percent alumina.

6. The fiber of claim 1, wherein the fiber exhibits a solubility of at least about 50 ng/cm$^2$-hr when exposed as a 0.1 g sample to a 0.3 ml/min of simulated lung fluid at 37° C.

7. The fiber of claim 1 wherein the fiber comprises the fiberization product of about 75 to about 76.5 weight percent silica, about 21 to about 23.5 weight percent magnesia, 0 to about 3.5 weight percent zirconia.

8. The fiber of claim 7 wherein the fiber comprises the fiberization product of about 75 to about 76.5 weight percent silica, about 21 to about 23.5 weight percent magnesia.

9. The fiber of claim 7 wherein said fiber exhibits a shrinkage of less than about 4.5% at 1260° C.

10. The fiber of any one of claims 1, 2, 3, 7 or 8 containing less than about 0.3 weight percent of calcia impurity.

11. A high temperature resistant fiber-containing article selected from the group consisting of blankets, papers, felts, cast shapes and composits, comprising the fiber of any one of claims 1–3.

12. A high temperature resistant fiber-containing blanket comprising the fiber of claim 8 or 9.

13. A low shrinkage, high temperature resistant glass fiber having a use temperature up to at least 1260° C., which maintains mechanical integrity after exposure to the use temperature and which is non-durable in physiological fluids, prepared by the method of forming a melt with ingredients comprising from about 69 to about 86 weight percent silica, from about 14 to about 35 weight percent magnesia, 0 to about 7 weight percent zirconia, a viscosity modifier in an amount effective to render the melt fiberizable, less than 1 weight percent CaO, less than 0.4 weight percent $Fe_2O_3$ and substantially no alkali metal oxide; and producing fibers from the melt.

14. A low shrinkage, high temperature resistant glass fiber having a use temperature up to at least 1260° C., which maintains mechanical integrity after exposure to the use temperature and which is non-durable in physiological fluids, consisting essentially of a fiberization of about 69 to about 80 weight percent silica, from about 20 to about 31 weight percent magnesia, 0 to about 7 weight percent zirconia, a viscosity modifier in an amount effective to render the product fiberizable, less than 1 weight percent CaO, less than 0.4 weight percent $Fe_2O_3$ and substantially no alkali metal oxide.

15. The fiber of claim 14, wherein the fiber consists essentially of the fiberization product of about 71 to about 78 weight percent silica, about 20 to about 27.5 weight percent magnesia, 0 to about 5 weight percent zirconia, and said viscosity modifier.

16. The fiber of claim 14, wherein the fiber consists essentially of the fiberization product of about 71 to about 76.5 weight percent silica, about 21.5 to about 27.5 weight percent magnesia, 0 to about 4 weight percent zirconia, and said viscosity modifier.

17. The fiber of claim 14, wherein said fiber exhibits a shrinkage of less than about 4.5% at 1260° C.

18. The fiber of claim 14, wherein the fiber has less than about 1.5 weight percent alumina.

19. The fiber of claim 14, wherein the fiber exhibits a solubility of at least about 50 ng/cm$^2$-hr when exposed as a 0.1 g sample to a 0.3 ml/min of simulated lung fluid at 37° C.

20. The fiber of claim 14, wherein the fiber consists essentially of the fiberization product of about 75 to about 76.5 weight percent silica, about 21 to about 23.5 weight percent magnesia, 0 to about 3.5 weight percent zirconia, and said viscosity modifier.

21. The fiber of claim 20 wherein the fiber consists essentially of the fiberization product of about 75 to about 76.5 weight percent silica, about 21 to about 23.5 weight percent magnesia, and said viscosity modifier.

22. The fiber of claim 20 wherein said fiber exhibits a shrinkage of less than about 4.5% at 1260° C.

23. The fiber of any one of claims 14, 15, 16, 20 or 24 having less than about 0.3 weight percent of calcia impurity.

24. A high temperature resistant fiber-containing article selected from the group consisting of blankets, papers, felts, cast shapes and composites, comprising the fiber of any one of claims 14–16.

25. A high temperature resistant fiber-containing blanket comprising the fiber of claim 20 or 21.

26. A low shrinkage, high temperature resistant glass fiber having a use temperature up to at least 1260° C., which maintains mechanical integrity after exposure to the use temperature and which is non-durable in physiological fluids, prepared by the method of forming a melt with ingredients consisting essentially of about 69 to about 86 weight percent silica, about 14 to about 35 weight percent magnesia, and 0 to 7 weight percent zirconia, a viscosity modifier in an amount effective to render the melt fiberizable, less than 1 weight percent CaO, less than 0.4 weight percent $Fe_2O_3$ and substantially no alkali metal oxide; and producing fibers from the melt.

27. A low shrinkage, high temperature resistant glass fiber having a use temperature up to at least 1260° C., which maintains mechanical integrity after exposure to the use temperature and which is non-durable in physiological fluids, comprising a fiberization product of about 69 to about 86 weight percent silica, from about 14 to about 35 weight percent magnesia, 0 to about 7 weight percent zirconia, a viscosity modifier in an amount effective to render the product fiberizable, less than 1 weight percent CaO, less than 0.4 weight percent $Fe_2O_3$ and substantially no alkali metal oxide.

28. The fiber of claim 27, wherein said fiber exhibits a shrinkage of less than about 4.5% at 1260° C.

29. The fiber of claim 27, wherein the fiber exhibits a solubility of at least about 30 $ng/cm^2$-hr when exposed as a 0.1 g sample to a 0.3 ml/min of simulated lung fluid at 37° C.

30. A low shrinkage, high temperature resistant glass fiber having a use temperature up to at least 1260° C., which maintains mechanical integrity after exposure to the use temperature and which is non-durable in physiological fluids, consisting essentially of a product of from about 69 to about 86 weight percent silica, from about 14 to about 35 weight percent magnesia, 0 to about 7 weight percent zirconia, a viscosity modifier in an amount effective to render the product fiberizable, less than 1 weight percent CaO, less than 0.4 weight percent $Fe_2O_3$ and substantially no alkali metal oxide.

31. The fiber of claim 30, wherein said fiber exhibits a shrinkage of less than about 4.5% at 1260° C.

32. The fiber of claim 30, wherein the fiber exhibits a solubility of at least about 30 $ng/cm^2$-hr when exposed as a 0.1 g sample to a 0.3 ml/min of simulated lung fluid at 37° C.

* * * * *